US012699000B2

(12) United States Patent

Ophardt et al.

(10) Patent No.: US 12,699,000 B2

(45) Date of Patent: Aug. 4, 2026

(54) SYSTEM FOR MONITORING PRODUCT LEVEL IN A DISPENSER USING A LOAD CELL

(71) Applicant: OP-Hygiene IP GmbH, Niederbipp (CH)

(72) Inventors: Heiner Ophardt, Arisdorf (CH); Edward Daniel House, Grimsby (CA); Jawed Alam, Thorold (CA); John Gerard Garry, St. Catharines (CA)

(73) Assignee: OP-HYGIENE IP GMBH, Niederbipp (CH)

( * ) Notice: Subject to any disclaimer, the term of this patent is extended or adjusted under 35 U.S.C. 154(b) by 329 days.

(21) Appl. No.: 18/462,299

(22) Filed: Sep. 6, 2023

(65) Prior Publication Data

US 2024/0085236 A1 Mar. 14, 2024

Related U.S. Application Data

(60) Provisional application No. 63/404,365, filed on Sep. 7, 2022.

(51) Int. Cl.
| | |
|---|---|
| *G01G 13/28* | (2006.01) |
| *A47K 5/12* | (2006.01) |
| *A47K 10/32* | (2006.01) |

(52) U.S. Cl.
CPC ........... *G01G 13/28* (2013.01); *A47K 5/1217* (2013.01); *A47K 10/32* (2013.01); *A47K 2010/3226* (2013.01)

(58) Field of Classification Search
CPC ...... G01G 13/28; A47K 5/1217; A47K 10/32; A47K 2010/3226

USPC ................................................. 235/375, 385
See application file for complete search history.

(56) References Cited

U.S. PATENT DOCUMENTS

| | | | |
|---|---|---|---|
| 6,092,726 A | 7/2000 | Toussant et al. | |
| 7,410,623 B2 | 8/2008 | Mehus et al. | |
| 7,954,668 B2 * | 6/2011 | Mehus | G01G 23/01 |
| | | | 222/64 |
| 8,113,431 B2 | 2/2012 | Gregerson | |
| 8,277,745 B2 | 10/2012 | Mehus et al. | |
| 9,376,306 B2 | 6/2016 | Mehus et al. | |
| 10,262,293 B1 * | 4/2019 | Prater | G06Q 10/087 |
| 10,368,701 B2 | 8/2019 | Ophardt et al. | |
| 11,940,320 B1 * | 3/2024 | Bhadsavle | G01G 23/18 |
| 2004/0226959 A1 * | 11/2004 | Mehus | B67D 7/02 |
| | | | 222/1 |
| 2004/0230339 A1 * | 11/2004 | Maser | G06Q 10/087 |
| | | | 700/240 |
| 2009/0151474 A1 * | 6/2009 | Mehus | G01G 3/14 |
| | | | 73/862.52 |
| 2015/0253173 A1 | 9/2015 | Cedulf et al. | |

(Continued)

FOREIGN PATENT DOCUMENTS

| | | |
|---|---|---|
| WO | 2018100353 | 6/2018 |

*Primary Examiner* — Paultep Savusdiphol
(74) *Attorney, Agent, or Firm* — Thorpe North & Western, LLP

(57) ABSTRACT

A system comprising a storage member and a load cell. The storage member is for storing a product. The load cell measures a force applied to the load cell. At least part of the force applied to the load cell is provided, directly or indirectly, by a weight of the product. The system is configured to determine a quantity of the product based, at least in part, on the force measured by the load cell.

20 Claims, 22 Drawing Sheets

(56)               References Cited

U.S. PATENT DOCUMENTS

| | | | |
|---|---|---|---|
| 2016/0264394 A1* | 9/2016 | Hershberger | ........ B67D 1/0888 |
| 2019/0236527 A1* | 8/2019 | Bhaumik | ............. G06Q 10/087 |
| 2019/0251507 A1* | 8/2019 | Conrad | ............. G06Q 10/0875 |
| 2019/0359470 A1* | 11/2019 | Joshi | ........................ G07F 9/026 |
| 2019/0392378 A1* | 12/2019 | Alvo | .................... G06Q 10/087 |
| 2020/0368113 A1* | 11/2020 | Chen | .................... A61J 7/0436 |
| 2022/0067689 A1* | 3/2022 | Guack | ..................... G06T 7/251 |
| 2022/0167788 A1* | 6/2022 | Oh | ........................ G05B 19/042 |
| 2022/0335371 A1* | 10/2022 | Von Drasek | ........... G01G 13/02 |
| 2023/0410036 A1* | 12/2023 | Conrad | ............. G06K 7/10366 |

* cited by examiner

Measured
Stopping
Force

Volume of Fluid Dispensed

SYSTEM FOR MONITORING PRODUCT LEVEL IN A DISPENSER USING A LOAD CELL

RELATED APPLICATION

This application claims priority to the 7 Sep. 2022 filing date of U.S. Provisional Patent Application Ser. No. 63/404, 365, which is incorporated herein by reference.

FIELD OF THE INVENTION

This invention relates to hygiene apparatuses, and more particularly to systems that use a load cell or load cells to monitor product levels in an apparatus.

BACKGROUND OF THE INVENTION

A wide variety of dispensers are known for dispensing various hygiene products, such as hand cleaning fluid, toilet paper, paper towels, wipes, and gloves. Typically, these dispensers contain a supply of the product to be dispensed, which needs to be refilled or replaced periodically.

In many previously known systems, the product level in a dispenser needs to be manually checked, such as by maintenance personnel removing a cover of the dispenser and observing the product level inside the dispenser. This process is time consuming and labor intensive.

SUMMARY OF THE INVENTION

To at least partially overcome some of the disadvantages of previously known systems, devices and methods, in one aspect the present invention provides a system including a storage member and a load cell. The storage member is for storing a product, and the load cell measures a force applied to the load cell. The storage member is preferably arranged such that at least part of the force applied to the load cell is provided, directly or indirectly, by a weight of the product. The system is furthermore configured to determine a quantity of the product based, at least in part, on the force measured by the load cell.

The inventors have appreciated that the system advantageously allows the product level to be determined independently of product viscosity, color, conductivity or other factors that could influence other types of level sensing, such as optical or capacitive level sensing.

The inventors have furthermore developed a number of advantageous uses of the system. For example, the system may optionally be configured to monitor the quantity of the product over time; determine the amount of the product dispensed; provide an indication when the quantity of the product reaches a threshold level; identify the storage member or the product; and/or detect dispensing events, all based, at least in part, on the force measured by the load cell. This information can then be used for a variety of purposes, such as recording usage data and hygiene compliance data; providing warnings when hygiene protocols are not followed; and automatically generating, modifying, and completing maintenance tasks, such as refilling dispensers.

The inventors have appreciated that the invention can be used with a wide variety of devices, such as hand cleaning fluid dispensers, toilet paper dispensers, paper towel dispensers, wipe dispensers, glove dispensers, and waste bins. The invention may also be incorporated into a universal mount, which can mount a wide variety of different dispensers and devices. Preferably, the universal mount can be used to provide smart functionality to a wide variety of devices, using the data obtained from the load cell.

The sensing data from the load cell may be processed locally in the device/dispenser itself, and/or may be communicated in raw or processed form to an external server/computer for processing and for other uses, such as compliance monitoring.

Accordingly, in a first aspect the present invention resides in a system comprising: a storage member for storing a product; and a load cell that measures a force applied to the load cell; wherein at least part of the force applied to the load cell is provided, directly or indirectly, by a weight of the product; and wherein the system is configured to determine a quantity of the product based, at least in part, on the force measured by the load cell.

In a second aspect, the present invention resides in a system, which optionally incorporates one or more features in accordance with the first aspect, wherein the system is configured to monitor the quantity of the product over time.

In a third aspect, the present invention resides in a system, which optionally incorporates one or more features in accordance with one or more of the first and second aspects, wherein the system is configured to provide an indication when the quantity of the product reaches a threshold level.

In a fourth aspect, the present invention resides in a system, which optionally incorporates one or more features in accordance with one or more of the first to third aspects, wherein the indication indicates that the product is to be at least one of: restocked, refilled, replaced, and emptied.

In a fifth aspect, the present invention resides in a system, which optionally incorporates one or more features in accordance with one or more of the first to fourth aspects, wherein the system is configured to identify at least one of the storage member and the product based, at least in part, on the force measured by the load cell.

In a sixth aspect, the present invention resides in a system, which optionally incorporates one or more features in accordance with one or more of the first to fifth aspects, wherein the system is configured to identify at least one of the storage member and the product based, at least in part, on changes in the force measured by the load cell over time.

In a seventh aspect, the present invention resides in a system, which optionally incorporates one or more features in accordance with one or more of the first to sixth aspects, wherein the product comprises at least one of: hand cleaning fluid, toilet paper, paper towel, wipes, gloves, cleaning products, hygiene products, and waste.

In an eighth aspect, the present invention resides in a system, which optionally incorporates one or more features in accordance with one or more of the first to seventh aspects, wherein the system comprises a dispenser for dispensing the product.

In a ninth aspect, the present invention resides in a system, which optionally incorporates one or more features in accordance with one or more of the first to eighth aspects, wherein the system is configured to detect dispensing events, in which the product is dispensed from the dispenser, based, at least in part, on changes in the force measured by the load cell.

In a tenth aspect, the present invention resides in a system, which optionally incorporates one or more features in accordance with one or more of the first to ninth aspects, wherein the system is configured to detect failed dispensing events, in which the dispenser is activated without the product being dispensed from the dispenser, based, at least in part, on the force measured by the load cell.

In an eleventh aspect, the present invention resides in a system, which optionally incorporates one or more features in accordance with one or more of the first to tenth aspects, wherein the system is configured to provide an indication upon detecting the failed dispensing events.

In a twelfth aspect, the present invention resides in a system, which optionally incorporates one or more features in accordance with one or more of the first to eleventh aspects, wherein the system is configured to identify at least one of the storage member and the product based, at least in part, on the force measured by the load cell; and wherein the system is configured to adjust an operating parameter of the dispenser based, at least in part, on the identity of the at least one of the storage member and the product.

In a thirteenth aspect, the present invention resides in a system, which optionally incorporates one or more features in accordance with one or more of the first to twelfth aspects, wherein the operating parameter comprises at least one of: a dosage setting of the dispenser, and the threshold level.

In a fourteenth aspect, the present invention resides in a system, which optionally incorporates one or more features in accordance with one or more of the first to thirteenth aspects, wherein the product comprises a fluid, and wherein identifying the at least one of the storage member and the product comprises at least one of: identifying a type of the fluid and identifying a size of the storage member.

In a fifteenth aspect, the present invention resides in a system, which optionally incorporates one or more features in accordance with one or more of the first to fourteenth aspects, wherein the dispenser comprises the storage member; and wherein the system is configured to identify the dispenser based, at least in part, on the force measured by the load cell.

In a sixteenth aspect, the present invention resides in a system, which optionally incorporates one or more features in accordance with one or more of the first to fifteenth aspects, wherein the system is configured to determine a dosage setting of the dispenser based, at least in part, on changes in the force measured by the load cell.

In a seventeenth aspect, the present invention resides in a system, which optionally incorporates one or more features in accordance with one or more of the first to sixteenth aspects, wherein the system is configured to determine the dosage setting of the dispenser during an initial time period; and wherein the system is configured to determine the quantity of the product during a subsequent time period based, at least in part, on the dosage setting.

In an eighteenth aspect, the present invention resides in a system, which optionally incorporates one or more features in accordance with one or more of the first to seventeenth aspects, wherein the storage member comprises a rigid reservoir or a collapsible reservoir, and the product is a fluid; wherein the collapsible reservoir collapses as the fluid is dispensed from the collapsible reservoir; wherein the system comprises a housing; wherein the collapsible reservoir engages with the housing as the collapsible reservoir collapses; wherein the engagement of the collapsible reservoir with the housing is detectable as a change in a pattern of the force measured by the load cell; and wherein the system is configured to determine whether the storage member comprises the rigid reservoir or the collapsible reservoir based, at least in part, on the pattern of the force measured by the load cell.

In a nineteenth aspect, the present invention resides in a system, which optionally incorporates one or more features in accordance with one or more of the first to eighteenth aspects, wherein the system is configured to determine a dosage setting of the dispenser based, at least in part, on changes in the force measured by the load cell during an initial time period; and if the system determines that the storage member comprises the collapsible reservoir, the system is configured to determine the quantity of the product during a subsequent time period based, at least in part, on the dosage setting and a detected number of dispensing events.

In a twentieth aspect, the present invention resides in a system, which optionally incorporates one or more features in accordance with one or more of the first to nineteenth aspects, wherein the system is configured to determine when at least one of the storage member and the product is at least one of: removed, replaced, emptied, and refilled, based, at least in part, on the force measured by the load cell.

In a twenty first aspect, the present invention resides in a system, which optionally incorporates one or more features in accordance with one or more of the first to twentieth aspects, wherein the system is configured to at least one of: generate, modify, and complete maintenance tasks based, at least in part, on the force measured by the load cell.

In a twenty second aspect, the present invention resides in a method, which optionally incorporates one or more features in accordance with one or more of the first to twenty first aspects, comprising: storing a product in a storage member; applying a force to a load cell, at least part of the force being provided, directly or indirectly, by a weight of the product; measuring the force with the load cell; and determining a quantity of the product based, at least in part, on the force measured by the load cell.

In a twenty third aspect, the present invention resides in a dispenser, which optionally incorporates one or more features in accordance with one or more of the first to twenty second aspects, comprising: a storage member for storing a product; and a load cell that measures a force applied to the load cell; wherein at least part of the force applied to the load cell is provided, directly or indirectly, by a weight of the product; and wherein the dispenser is configured to determine a quantity of the product based, at least in part, on the force measured by the load cell.

In a twenty fourth aspect, the present invention resides in a dispenser, which optionally incorporates one or more features in accordance with one or more of the first to twenty third aspects, further comprising: a housing; and a pump mounting body that is pivotally mounted to the housing; wherein the storage member comprises a fluid cartridge and the product comprises a hand cleaning fluid; wherein the pump mounting body carries the fluid cartridge; wherein the pump mounting body has a mechanism for activating the fluid cartridge to dispense the fluid from the fluid cartridge; wherein the pump mounting body comprises the load cell; wherein the weight of the product biases the pump mounting body into engagement with a surface of the housing; and wherein the load cell measures the force resulting from the engagement of the pump mounting body with the surface of the housing.

In a twenty fifth aspect, the present invention resides in a mount, which optionally incorporates one or more features in accordance with one or more of the first to twenty fourth aspects, comprising: a housing; an attachment member that is moveably connected to the housing; and a load cell that measures a force exerted between the housing and the attachment member; wherein the attachment member is configured to couple to a device; and wherein at least part of the force measured by the load cell is provided, directly or indirectly, by a weight of the device.

In a twenty sixth aspect, the present invention resides in a mount, which optionally incorporates one or more features in accordance with one or more of the first to twenty fifth aspects, wherein the mount is configured to determine a quantity of a product contained in the device based, at least in part, on the force measured by the load cell.

In a twenty seventh aspect, the present invention resides in a mount, which optionally incorporates one or more features in accordance with one or more of the first to twenty sixth aspects, wherein the mount is configured to identify the device based, at least in part, on the force measured by the load cell.

In a twenty eighth aspect, the present invention resides in a mount, which optionally incorporates one or more features in accordance with one or more of the first to twenty seventh aspects, wherein the mount is configured to identify the device based, at least in part, on the force measured by the load cell over time.

In a twenty ninth aspect, the present invention resides in a mount, which optionally incorporates one or more features in accordance with one or more of the first to twenty eighth aspects, wherein the attachment member is pivotally connected to the housing; and wherein the weight of the device biases the attachment member to pivot about a pivot axis relative to the housing.

In a thirtieth aspect, the present invention resides in a mount, which optionally incorporates one or more features in accordance with one or more of the first to twenty ninth aspects, wherein the attachment member has an attachment surface that is configured to couple to the device.

In a thirty first aspect, the present invention resides in a mount, which optionally incorporates one or more features in accordance with one or more of the first to thirtieth aspects, wherein the mount has a vertical mounting position, in which the attachment surface is substantially vertical.

In a thirty second aspect, the present invention resides in a mount, which optionally incorporates one or more features in accordance with one or more of the first to thirty first aspects, wherein the mount has a horizontal mounting position, in which the attachment surface is substantially horizontal.

In a thirty third aspect, the present invention resides in a mount, which optionally incorporates one or more features in accordance with one or more of the first to thirty second aspects, wherein the mount has a vertical mounting position, in which the attachment surface is substantially vertical; wherein the mount has a horizontal mounting position, in which the attachment surface is substantially horizontal; and wherein the mount is configured to determine whether the mount is in the vertical mounting position or the horizontal mounting position based, at least in part, on the force measured by the load cell.

In a thirty fourth aspect, the present invention resides in a system, which optionally incorporates one or more features in accordance with one or more of the first to thirty third aspects, comprising: the mount according to any one of the twenty fifth to thirty third aspects.

In a thirty fifth aspect, the present invention resides in a system, which optionally incorporates one or more features in accordance with one or more of the first to thirty fourth aspects, wherein the system is configured to determine a quantity of a product contained in the device based, at least in part, on the force measured by the load cell.

In a thirty sixth aspect, the present invention resides in a system, which optionally incorporates one or more features in accordance with one or more of the first to thirty fifth aspects, wherein the system is configured to monitor the quantity of the product over time.

In a thirty seventh aspect, the present invention resides in a system, which optionally incorporates one or more features in accordance with one or more of the first to thirty sixth aspects, wherein the system is configured to provide an indication when the quantity of the product reaches a threshold level.

In a thirty eighth aspect, the present invention resides in a system, which optionally incorporates one or more features in accordance with one or more of the first to thirty seventh aspects, wherein the indication indicates that the product is to be at least one of: restocked, refilled, replaced, and emptied.

In a thirty ninth aspect, the present invention resides in a system, which optionally incorporates one or more features in accordance with one or more of the first to thirty eighth aspects, wherein the system is configured to identify the device based, at least in part, on the force measured by the load cell.

In a fortieth aspect, the present invention resides in a system, which optionally incorporates one or more features in accordance with one or more of the first to thirty ninth aspects, wherein the system is configured to identify the device based, at least in part, on the force measured by the load cell over time.

In a forty first aspect, the present invention resides in a system, which optionally incorporates one or more features in accordance with one or more of the first to fortieth aspects, wherein, if the device comprises a dispenser, the system is configured to detect dispensing events, in which the product is dispensed from the dispenser, based, at least in part, on changes in the force measured by the load cell.

In a forty second aspect, the present invention resides in a system, which optionally incorporates one or more features in accordance with one or more of the first to forty first aspects, wherein the system is configured to detect failed dispensing events, in which the dispenser is activated without the product being dispensed from the dispenser, based, at least in part, on the force measured by the load cell.

In a forty third aspect, the present invention resides in a system, which optionally incorporates one or more features in accordance with one or more of the first to forty second aspects, wherein the system is configured to provide an indication upon detecting the failed dispensing events.

In a forty fourth aspect, the present invention resides in a system, which optionally incorporates one or more features in accordance with one or more of the first to forty third aspects, wherein the system is configured to determine a dosage setting of the dispenser based, at least in part, on changes in the force measured by the load cell.

In a forty fifth aspect, the present invention resides in a system, which optionally incorporates one or more features in accordance with one or more of the first to forty fourth aspects, wherein the system is configured to determine when the product is at least one of: dispensed, removed, replaced, emptied, and refilled, based, at least in part, on the force measured by the load cell.

In a forty sixth aspect, the present invention resides in a system, which optionally incorporates one or more features in accordance with one or more of the first to forty fifth aspects, wherein the system is configured to at least one of: generate, modify, and complete maintenance tasks based, at least in part, on the force measured by the load cell.

In a forty seventh aspect, the present invention resides in a system, which optionally incorporates one or more features in accordance with one or more of the first to forty sixth aspects, wherein the system comprises the mount in accordance with any one of the twenty fifth to thirty third aspects.

In a forty eighth aspect, the present invention resides in a system, which optionally incorporates one or more features in accordance with one or more of the first to forty seventh aspects, wherein the system comprises a waste bin and the product comprises waste.

Further aspects of the invention include:

A system, which optionally incorporates one or more features of any one or more of the following and/or preceding aspects, comprising: a storage member for storing a product; and a load cell that measures a force applied to the load cell; wherein at least part of the force applied to the load cell is provided, directly or indirectly, by a weight of the product; and wherein the system is configured to determine a quantity of the product stored within the storage member based, at least in part, on the force measured by the load cell.

A system, which optionally incorporates one or more features of any one or more of the following and/or preceding aspects, wherein the system is configured to monitor the quantity of the product over time; and wherein the system is configured to provide an indication when the quantity of the product reaches a threshold level.

A system, which optionally incorporates one or more features of any one or more of the following and/or preceding aspects, wherein the system is configured to identify at least one of the storage member and the product based, at least in part, on the force measured by the load cell.

A system, which optionally incorporates one or more features of any one or more of the following and/or preceding aspects, wherein the product comprises at least one of: hand cleaning fluid, toilet paper, paper towel, wipes, gloves, cleaning products, hygiene products, and waste.

A system, which optionally incorporates one or more features of any one or more of the following and/or preceding aspects, wherein the system comprises a dispenser for dispensing the product.

A system, which optionally incorporates one or more features of any one or more of the following and/or preceding aspects, wherein the system is configured to detect dispensing events, in which the product is dispensed from the dispenser, based, at least in part, on changes in the force measured by the load cell.

A system, which optionally incorporates one or more features of any one or more of the following and/or preceding aspects, wherein the system is configured to detect failed dispensing events, in which the dispenser is activated without the product being dispensed from the dispenser, based, at least in part, on the force measured by the load cell.

A system, which optionally incorporates one or more features of any one or more of the following and/or preceding aspects, wherein the system is configured to identify at least one of the storage member and the product based, at least in part, on the force measured by the load cell; and wherein the system is configured to adjust an operating parameter of the dispenser based, at least in part, on the identity of the at least one of the storage member and the product.

A system, which optionally incorporates one or more features of any one or more of the following and/or preceding aspects, wherein the system comprises a dispenser for dispensing the product; wherein the system is configured to identify at least one of the dispenser, the storage member, and the product based, at least in part, on the force measured by the load cell; wherein the system is configured to adjust an operating parameter based, at least in part, on the identity of the at least one of the dispenser, the storage member, and the product; wherein the operating parameter comprises at least one of: a dosage setting of the dispenser, and the threshold level; wherein the product comprises a fluid; and wherein identifying the at least one of the storage member and the product comprises at least one of: identifying a type of the fluid and identifying a size of the storage member.

A system, which optionally incorporates one or more features of any one or more of the following and/or preceding aspects, wherein the dispenser comprises the storage member; and wherein the system is configured to identify the dispenser based, at least in part, on the force measured by the load cell.

A system, which optionally incorporates one or more features of any one or more of the following and/or preceding aspects, wherein the system is configured to determine a dosage setting of the dispenser based, at least in part, on changes in the force measured by the load cell; wherein the system is configured to determine the dosage setting of the dispenser during an initial time period; and wherein the system is configured to determine the quantity of the product during a subsequent time period based, at least in part, on the dosage setting.

A system, which optionally incorporates one or more features of any one or more of the following and/or preceding aspects, wherein the storage member comprises a rigid reservoir or a collapsible reservoir, and the product is a fluid; wherein the collapsible reservoir collapses as the fluid is dispensed from the collapsible reservoir; wherein the system comprises a housing; wherein the collapsible reservoir engages with the housing as the collapsible reservoir collapses; wherein the engagement of the collapsible reservoir with the housing is detectable as a change in a pattern of the force measured by the load cell; and wherein the system is configured to determine whether the storage member comprises the rigid reservoir or the collapsible reservoir based, at least in part, on the pattern of the force measured by the load cell.

A system, which optionally incorporates one or more features of any one or more of the following and/or preceding aspects, wherein the system is configured to determine a dosage setting of the dispenser based, at least in part, on changes in the force measured by the load cell during an initial time period; and if the system determines that the storage member comprises the collapsible reservoir, the system is configured to determine the quantity of the product during a subsequent time period based, at least in part, on the dosage setting and a detected number of dispensing events.

A system, which optionally incorporates one or more features of any one or more of the following and/or preceding aspects, wherein the system is configured to determine when at least one of the storage member and the product is at least one of: removed, replaced, emptied, and refilled, based, at least in part, on the force measured by the load cell.

A system, which optionally incorporates one or more features of any one or more of the following and/or preceding aspects, wherein the system is configured to at least one of: generate, modify, and complete maintenance tasks based, at least in part, on the force measured by the load cell.

A system, which optionally incorporates one or more features of any one or more of the following and/or preceding aspects, comprising: a storage member for storing a product; and a load cell that measures a force applied to the load cell; wherein at least part of the force applied to the load cell is provided, directly or indirectly, by a weight of the product; and wherein the system is configured to determine a quantity of the product stored within the storage member based, at least in part, on the force measured by the load cell.

A system, which optionally incorporates one or more features of any one or more of the following and/or preceding aspects, wherein the system is configured to monitor the quantity of the product over time.

A system, which optionally incorporates one or more features of any one or more of the following and/or preceding aspects, wherein the system is configured to provide an indication when the quantity of the product reaches a threshold level.

A system, which optionally incorporates one or more features of any one or more of the following and/or preceding aspects, wherein the system is configured to identify at least one of the storage member and the product based, at least in part, on the force measured by the load cell.

A system, which optionally incorporates one or more features of any one or more of the following and/or preceding aspects, wherein the system is configured to identify at least one of the storage member and the product based, at least in part, on changes in the force measured by the load cell over time.

A system, which optionally incorporates one or more features of any one or more of the following and/or preceding aspects, wherein the product comprises at least one of: hand cleaning fluid, toilet paper, paper towel, wipes, gloves, cleaning products, hygiene products, and waste.

A system, which optionally incorporates one or more features of any one or more of the following and/or preceding aspects, wherein the system comprises a dispenser for dispensing the product.

A system, which optionally incorporates one or more features of any one or more of the following and/or preceding aspects, wherein the system is configured to detect dispensing events, in which the product is dispensed from the dispenser, based, at least in part, on changes in the force measured by the load cell.

A system, which optionally incorporates one or more features of any one or more of the following and/or preceding aspects, wherein the system is configured to detect failed dispensing events, in which the dispenser is activated without the product being dispensed from the dispenser, based, at least in part, on the force measured by the load cell.

A system, which optionally incorporates one or more features of any one or more of the following and/or preceding aspects, wherein the system is configured to identify at least one of the storage member and the product based, at least in part, on the force measured by the load cell; and wherein the system is configured to adjust an operating parameter of the dispenser based, at least in part, on the identity of the at least one of the storage member and the product.

A system, which optionally incorporates one or more features of any one or more of the following and/or preceding aspects, wherein the system comprises a dispenser for dispensing the product; wherein the system is configured to identify at least one of the dispenser, the storage member, and the product based, at least in part, on the force measured by the load cell; wherein the system is configured to adjust an operating parameter based, at least in part, on the identity of the at least one of the dispenser, the storage member, and the product; and wherein the operating parameter comprises at least one of: a dosage setting of the dispenser, and the threshold level.

A system, which optionally incorporates one or more features of any one or more of the following and/or preceding aspects, wherein the product comprises a fluid, and wherein identifying the at least one of the storage member and the product comprises at least one of: identifying a type of the fluid and identifying a size of the storage member.

A system, which optionally incorporates one or more features of any one or more of the following and/or preceding aspects, wherein the dispenser comprises the storage member; and wherein the system is configured to identify the dispenser based, at least in part, on the force measured by the load cell.

A system, which optionally incorporates one or more features of any one or more of the following and/or preceding aspects, wherein the system is configured to determine a dosage setting of the dispenser based, at least in part, on changes in the force measured by the load cell.

A system, which optionally incorporates one or more features of any one or more of the following and/or preceding aspects, wherein the system is configured to determine the dosage setting of the dispenser during an initial time period; and wherein the system is configured to determine the quantity of the product during a subsequent time period based, at least in part, on the dosage setting.

A system, which optionally incorporates one or more features of any one or more of the following and/or preceding aspects, wherein the storage member comprises a rigid reservoir or a collapsible reservoir, and the product is a fluid; wherein the collapsible reservoir collapses as the fluid is dispensed from the collapsible reservoir; wherein the system comprises a housing; wherein the collapsible reservoir engages with the housing as the collapsible reservoir collapses; wherein the engagement of the collapsible reservoir with the housing is detectable as a change in a pattern of the force measured by the load cell; and wherein the system is configured to determine whether the storage member comprises the rigid reservoir or the collapsible reservoir based, at least in part, on the pattern of the force measured by the load cell.

A system, which optionally incorporates one or more features of any one or more of the following and/or preceding aspects, wherein the system is configured to determine a dosage setting of the dispenser based, at least in part, on changes in the force measured by the load cell during an initial time period; and if the system determines that the storage member comprises the collapsible reservoir, the system is configured to determine the quantity of the product during a subsequent time period based, at least in part, on the dosage setting and a detected number of dispensing events.

A system, which optionally incorporates one or more features of any one or more of the following and/or preceding aspects, wherein the system is configured to determine when at least one of the storage member and the product is at least one of: removed, replaced, emptied, and refilled, based, at least in part, on the force measured by the load cell.

A system, which optionally incorporates one or more features of any one or more of the following and/or preceding aspects, wherein the system is configured to at least one of: generate, modify, and complete maintenance tasks based, at least in part, on the force measured by the load cell.

A system, which optionally incorporates one or more features of any one or more of the following and/or preceding aspects, wherein the system comprises a waste bin and the product comprises waste.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
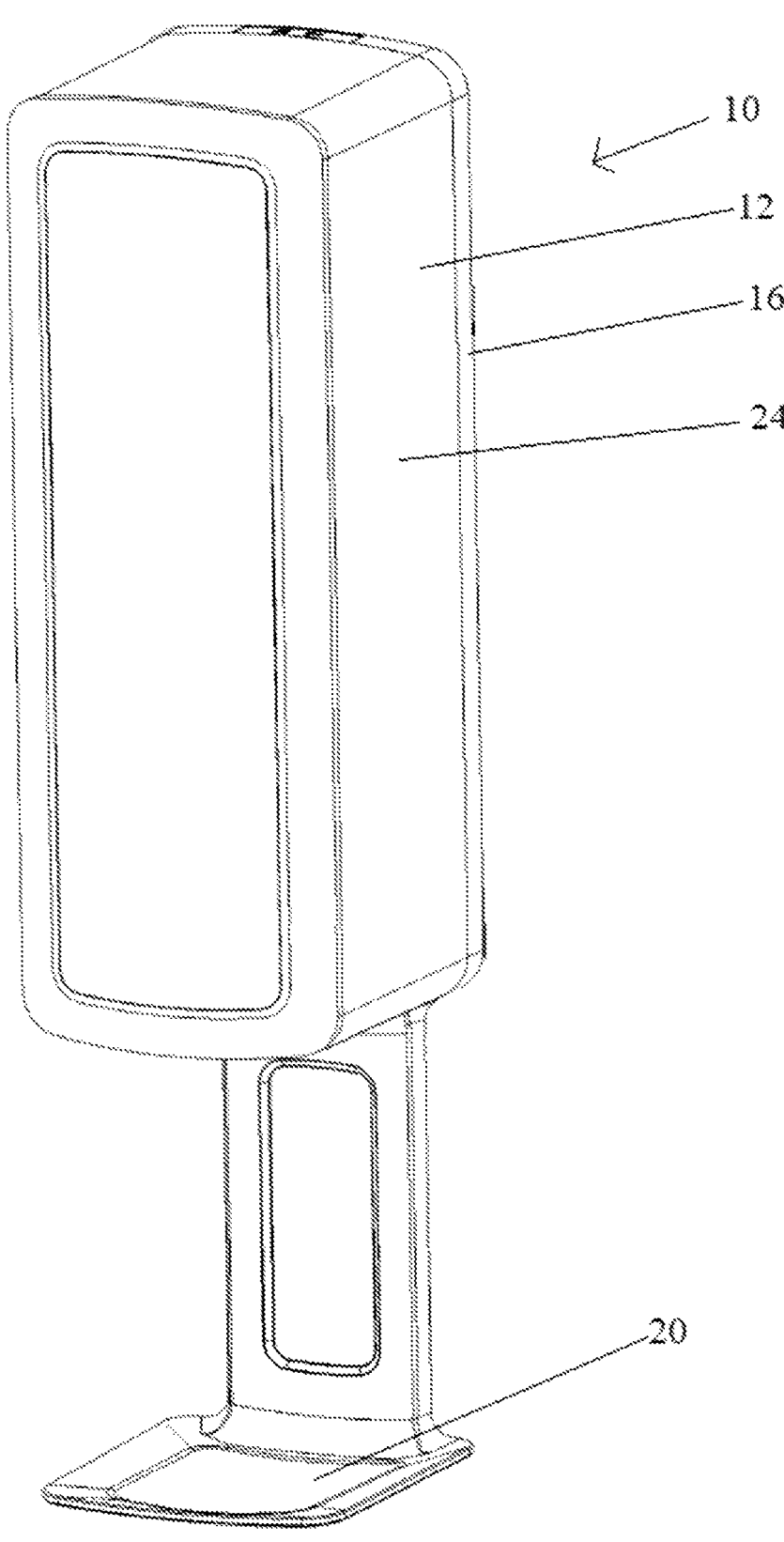
FIG. 1 is a perspective view of a hand cleaning fluid dispenser in accordance with a first embodiment of the present invention.
Figure 2:
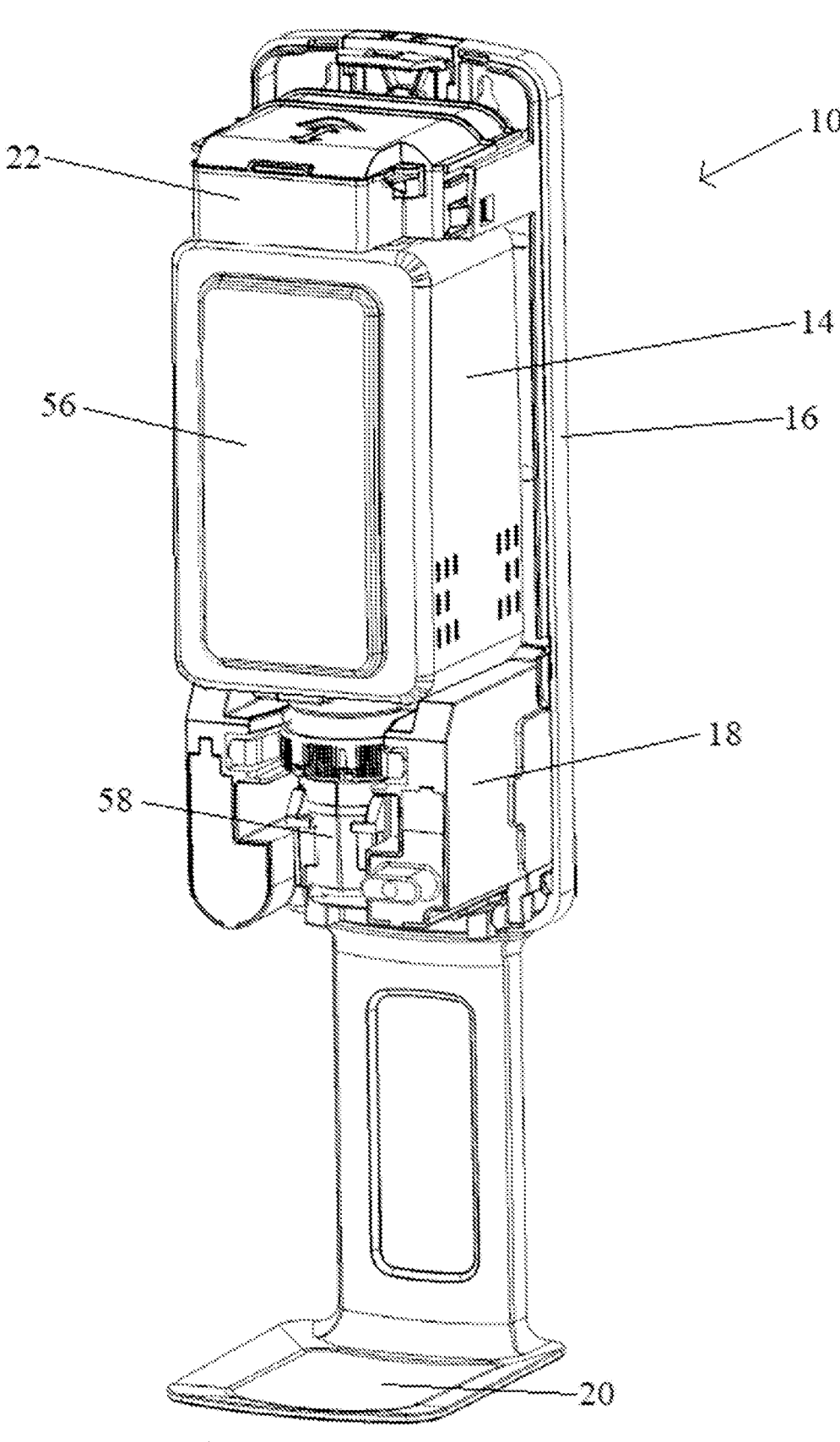
FIG. 2 is a perspective view of the hand cleaning fluid dispenser shown in FIG. 1, with a cover of the fluid dispenser omitted.

FIGS. 1 and 2 show a hand cleaning fluid dispenser 10 in accordance with a first embodiment of the present invention. The fluid dispenser 10 has a housing 12 and a replaceable fluid cartridge 14. The housing 12 includes a back plate 16, a pump mounting body 18, a drip tray 20, a battery pack 22, and a removable cover 24.

Figure 3:
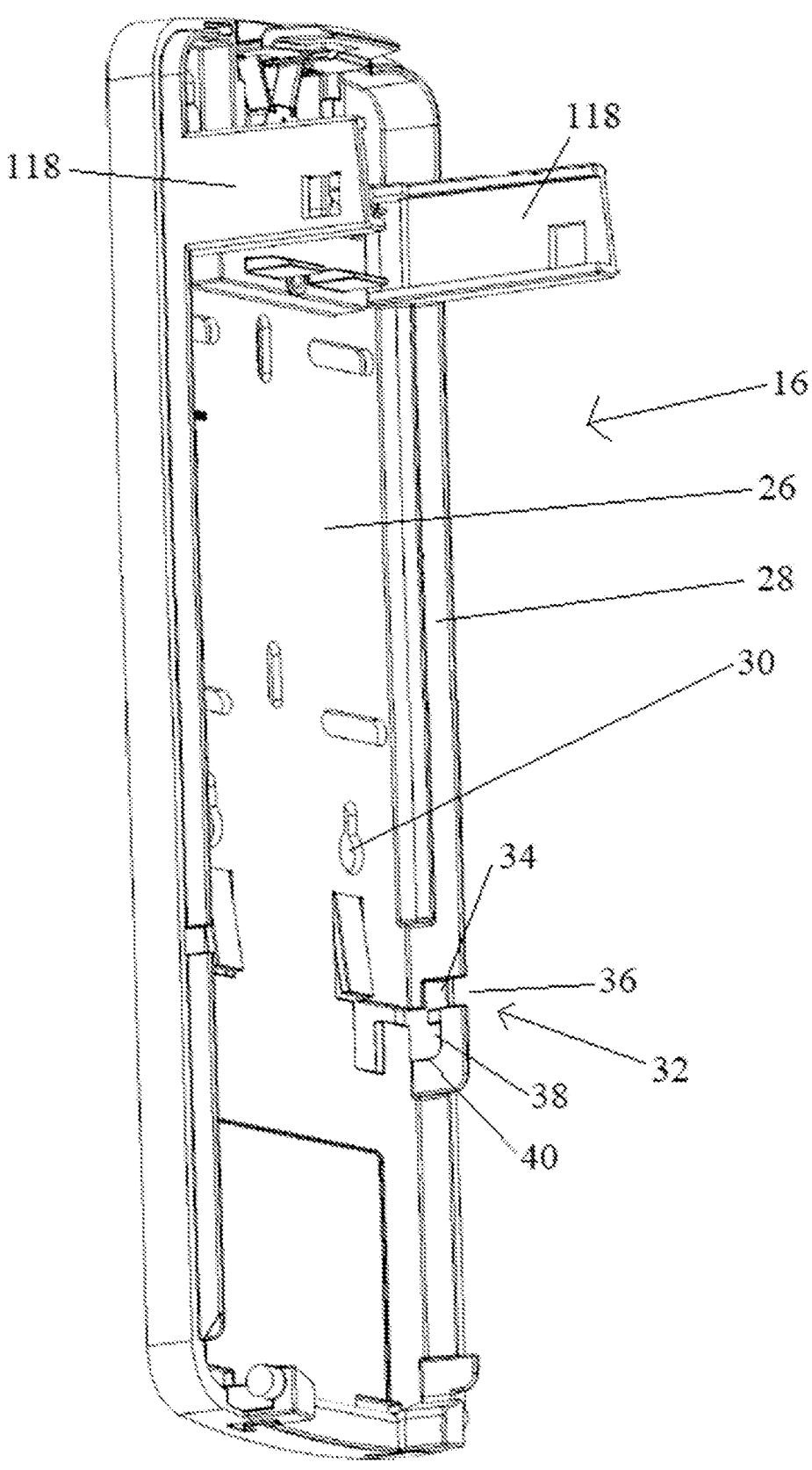
FIG. 3 is a left side perspective view of a back plate of the hand cleaning fluid dispenser shown in FIG. 1.
Figure 4:
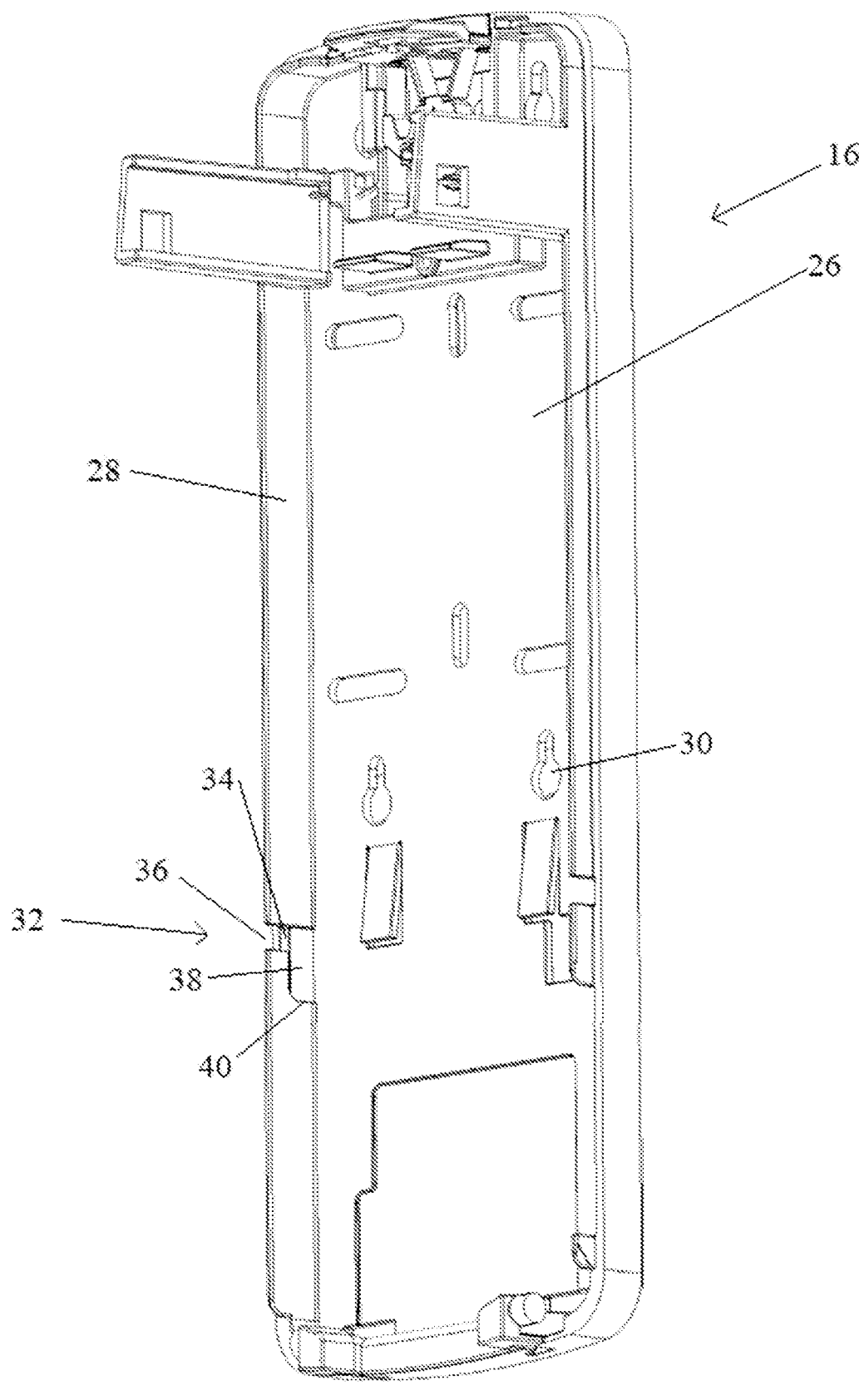
FIG. 4 is a right side perspective view of the back plate shown in FIG. 3.

As can be seen in FIGS. 3 and 4, the back plate 16 has a rear wall 26 and a lip portion 28 that extends forwardly from the perimeter of the rear wall 26. The rear wall 26 has several apertures 30 through which fasteners can be extended to secure the back plate 16 to a vertical support structure such as a wall or a post. The back plate 16 also has two battery receiving arms 118 for receiving the battery pack 22.

As can be seen in FIG. 3, the right side of the lip portion 28 has a mounting channel 32. The mounting channel 32 has a horizontal section 34 that extends rearwardly from an open front end 36 of the channel 32, and a vertical section 38 that extends downwardly from the horizontal section 34 to an upwardly facing stop surface 40. As can be seen in FIG. 4, the left side of the lip portion 28 also has a mounting channel 32.

The mounting channels 32 are for attaching the pump mounting body 18 to the back plate 16. As can be seen in FIG. 2, the pump mounting body 18 has a pump activating portion 42 that engages with the replaceable fluid cartridge 14. The pump activating portion 42 can be touchlessly activated to dispense hand cleaning fluid from the fluid cartridge 14 in a manner as is known in the art.

Figure 5:
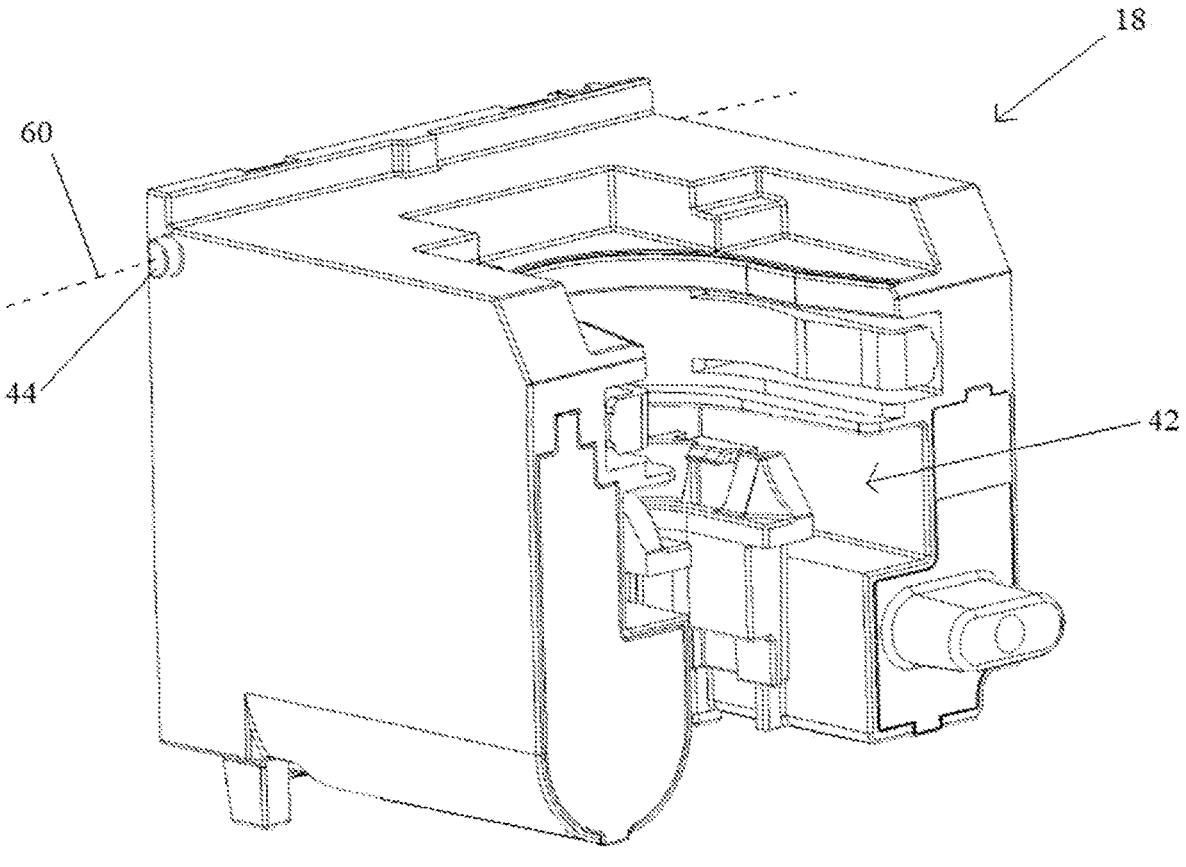
FIG. 5 is a front perspective view of a pump mounting body of the hand cleaning fluid dispenser shown in FIG. 1.
Figure 6:
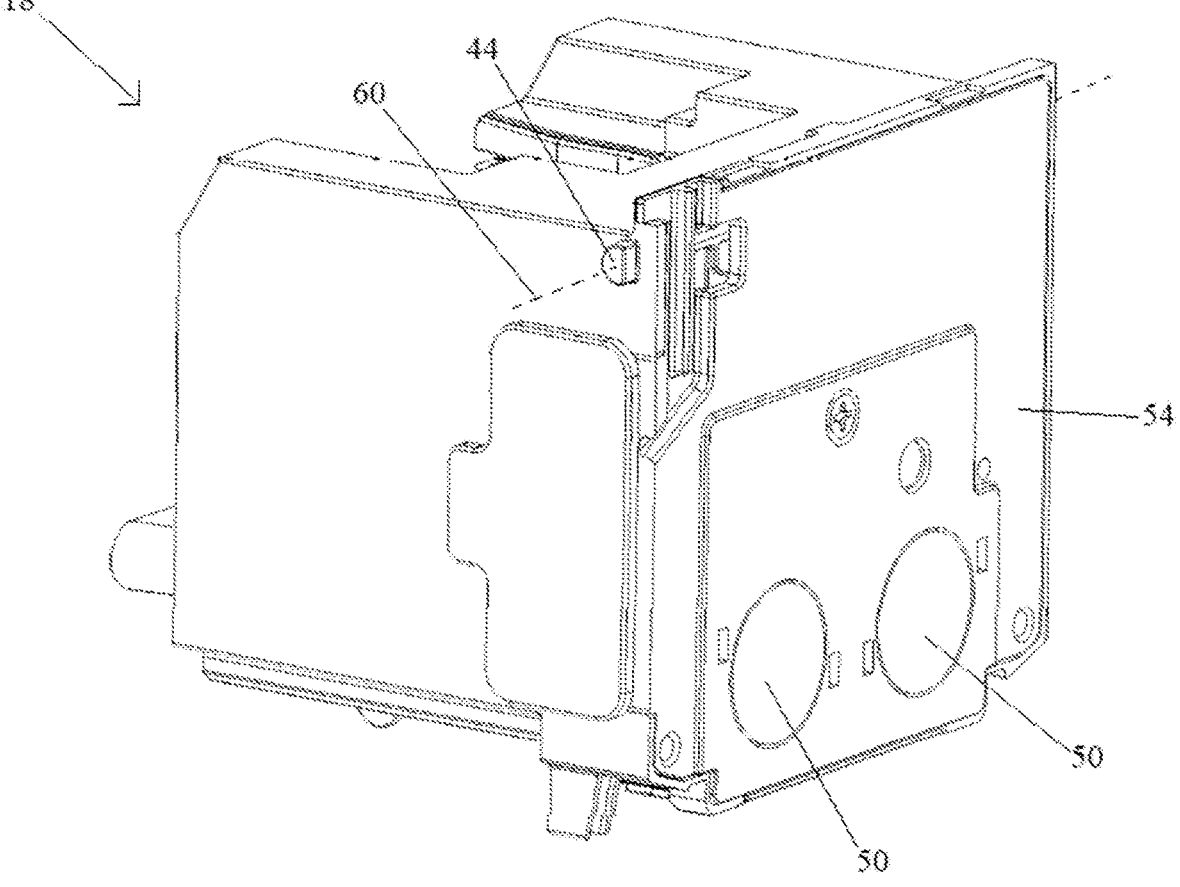
FIG. 6 is a rear perspective view of the pump mounting body shown in FIG. 5.

As can be seen in FIGS. 5 and 6, the pump mounting body 18 has a mounting finger 44 that extends laterally outwardly from a rear upper corner of the left side of the pump mounting body 18, and another mounting finger 44 that extends laterally outwardly from a rear upper corner of the right side of the pump mounting body 18. The mounting fingers 44 are configured to be received by the mounting channels 32 of the back plate 16, with the mounting fingers 44 resting on the stop surfaces 40 of the mounting channels 32. When the mounting fingers 44 are received by the mounting channels 32, the pump mounting body 18 is pivotable relative to the back plate 16 about a pivot axis 60 that extends through the mounting fingers 44. Alternatively, the back plate 16 could be provided with the mounting fingers 44 and the pump mounting body 18 could be provided with the mounting channels 32. Any arrangement permitting the pump mounting body 18 to pivot relative to the back plate 16 could be used.

Figure 7:
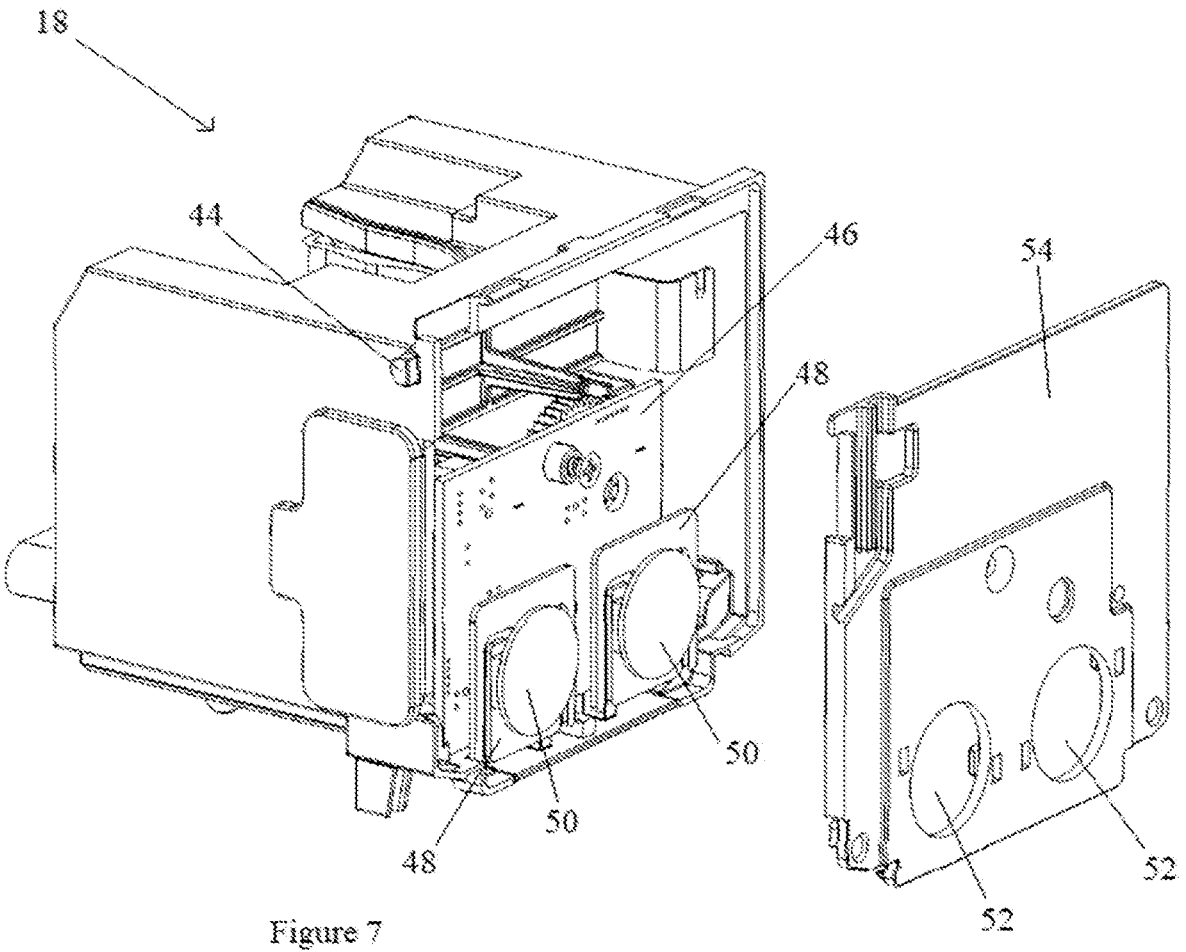
FIG. 7 is a partially exploded rear perspective view of the pump mounting body shown in FIG. 6.

As can be seen in FIG. 7, the pump mounting body 18 has a circuit board 46 with two strain gauges 48 connected thereto. Each strain gauge 48 has a circular bumper 50 that extends rearwardly from the strain gauge 48. As can be seen in FIG. 6, the circular bumpers 50 extend rearwardly through circular openings 52 in a back wall 54 of the pump mounting body 18. The strain gauges 48 are configured to detect and measure forces applied to the bumpers 50.

Although not shown in the drawings, the circuit board 46 also preferably has additional electronic components connected thereto, such as a controller, a processor, a memory, and/or a communication device. Any suitable electronic components for providing a desired functionality or functionalities to the dispenser 10 could be attached to the circuit board 46, or provided elsewhere in the dispenser 10. Electrical power for operating the electronic components is preferably provided by the battery pack 22.

As can be seen in FIG. 2, the replaceable fluid cartridge 14 includes a fluid reservoir 56 and a fluid pump 58. The fluid reservoir 56 is a bottle that contains a supply of the hand cleaning fluid to be dispensed from the dispenser 10. The fluid pump 58 is connected to the fluid reservoir 56 for dispensing the fluid from the reservoir 56. The fluid pump 58 engages with and is activated by the pump activating portion 42 of the pump mounting body 18 in a manner as is known in the art.

As can be seen in FIG. 1, the cover 24 removably engages with the lip portion 28 of the back plate 16 to cover the battery pack 22, the fluid cartridge 14, and the pump mounting body 18. The cover 24 can be removed in order to, for example, replace the fluid cartridge 14 when the level of fluid within the reservoir 56 is running low. Advantageously, the fluid dispenser 10 is able to determine the level of fluid within the cartridge 14 using the strain gauges 48 or load cells 48, as described in more detail below.

Figure 8:
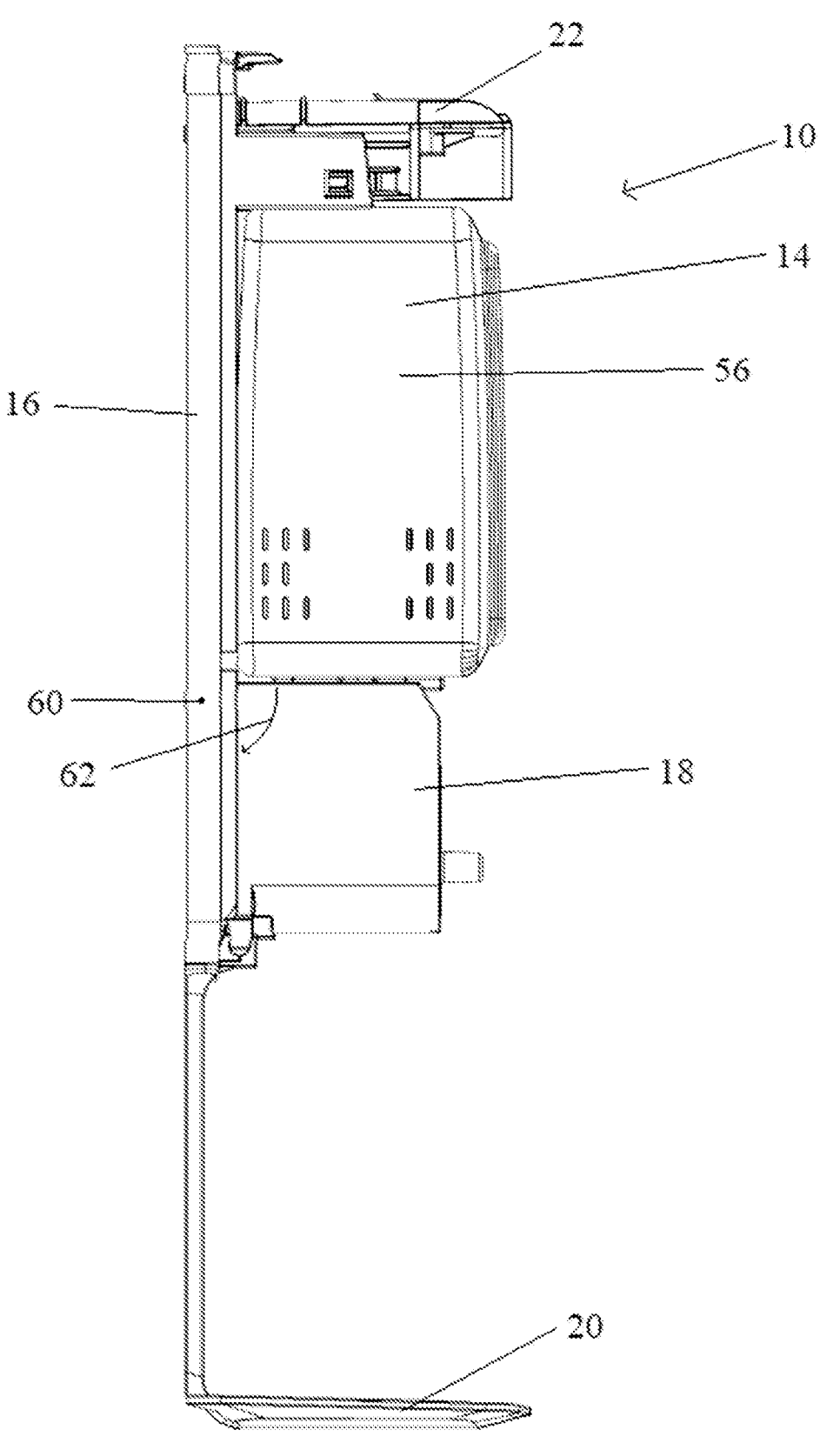
FIG. 8 is a side view of the hand cleaning fluid dispenser shown in FIG. 1, with the cover omitted.

As can be seen in FIG. 8, when the fluid cartridge 14 is received by the pump mounting body 18, the fluid reservoir 56 is positioned above the pump mounting body 18. Due to gravity, the fluid reservoir 56 exerts a downwards force on the pump mounting body 18, which, together with the weight of the pump mounting body 18 itself, causes the pump mounting body 18 to pivot about the pivot axis 60 in the direction of arrow 62. The pivoting of the pump mounting body 18 causes the bumpers 50 to engage with the rear wall 26 of the back plate 16. The rear wall 26 exerts a forwardly directed stopping force to the bumpers 50, which stops the rotation of the pump mounting body 18 about the pivot axis 60. The stopping force is detected and measured by the strain gauges 48. As the magnitude of the stopping force required to stop the rotation of the pump mounting body 18 is proportional to the weight of the fluid reservoir 56, the force detected by the strain gauges 48 can be used to calculate or estimate the amount of fluid contained in the fluid reservoir 56.

For example, in one optional configuration of the fluid dispenser 10, the dispenser 10 includes a memory that has a threshold value stored thereon, the threshold value corresponding to a magnitude of force measured by the stain gauges 48 when the fluid reservoir 56 contains a low level of the fluid. The low level may be defined, for example, as 25%, 15%, or 5% full, or any other desired level of fluid. The dispenser 10 further includes a processor that compares the magnitude of the stopping force measured by the strain gauges 48 to the threshold value, and determines that the fluid reservoir 56 has a low level of fluid if the measured stopping force is equal to or less than the threshold value.

The dispenser 10 is preferably further configured to provide a notification when there is a low level of fluid in the fluid reservoir 56. The notification may, for example, be in the form of a light, LED or other indicator on the fluid dispenser 10 that is activated when the processor determines that the level of fluid in the reservoir 56 is low. The notification may also be in the form of a communication sent by the dispenser 10, for example using Wi-Fi, that alerts maintenance staff of a low fluid level. The communication may be sent, for example, to phones or computers used by maintenance staff via e-mail or text message. The notification thus preferably allows maintenance staff to identify reservoirs 56 that need to be refilled or replaced, without requiring maintenance staff to proactively monitor the fluid levels in the dispensers 10, e.g. by removing the covers 24 and manually inspecting the reservoirs 56. The notification preferably identifies the location of the dispenser 10.

The dispenser 10 and/or external computers that receive data from the dispenser 10 are preferably able to determine various parameters about the dispenser 10 based on data from the strain gauges 48, alone or in combination with other data. For example, the strain gauges 48 may be used to determine when the replaceable cartridge 14 is removed or replaced. This can be done by programming the processor to recognize certain patterns of changes in the forces detected by the gauges 48. For example, a significant, sustained increase in the forces detected by the gauges 48 can be used as an indication that a new or refilled cartridge 14 has been installed in the housing 12. In some embodiments of the invention, software could be used to organize maintenance activities in the facility where the dispenser 10 is installed, with data from the strain gauges 48 being used to automatically generate, modify, and complete maintenance tasks that are assigned. For example, upon recognizing a low fluid level, the software could create a maintenance task to replace the cartridge 14. When the data from the strain gauge 48 shows that the cartridge 14 has been refilled or replaced, this may be used by the software to complete the task, for example, without requiring manual input by the maintenance personnel.

The strain gauges 48 may also be used to determine the type of fluid that is contained in the reservoir 56. For example, the dispenser 10 may be able to dispense two or more different types of fluids, such as soap and hand sanitizer, whose cartridges 14 have a different weight, e.g. because the fluids have different densities. By comparing the forces measured by the strain gauges 48 when a new cartridge 14 is installed to a set of reference values, the processor is preferably able to determine the type of fluid that is being dispensed. This information may be used, for example, to record usage information about the dispenser 10. The information could also be used to automatically adjust the operation of the dispenser 10, by for example adjusting the amount of fluid that is dispensed with each activation based on the type of fluid that is being dispensed.

In some embodiments of the invention, the housing 12 may be able to receive different cartridges 14 having different sizes and different weights. The processor is preferably able to identify which cartridge 14 has been installed by comparing the forces measured by the strain gauges 48 when a new cartridge 14 is installed to a set of reference values. This information may be used to alter various operating parameters of the dispenser 10. For example, the threshold value used for determining whether the fluid level is low could be different based on the identity of the cartridge 14 that has been installed.

In some embodiments of the invention, the fluid pump 58 and/or the pump mounting body 18 are adjustable to select a dosage of fluid that is dispensed with each activation of the dispenser 10. The strain gauges 48 can preferably be used to detect the dosage setting of the dispenser 10, by comparing the magnitude of the forces detected by the strain gauges 48 before and after an activation of the dispenser 10, as the difference in the forces is proportional to the amount of fluid dispensed. The determined dosage setting may be recorded and/or used to adjust various operating parameters of the dispenser 10. For example, the threshold value used for determining whether the fluid level is low could be adjusted based on the dosage setting, with for example a higher volume of fluid remaining in the reservoir 56 being considered a low fluid level when the dosage setting is high.

The processor may be able to detect activations of the dispenser 10 by comparing the forces measured by the strain gauges 48 to known patterns of force changes that occur on activation of the dispenser 10. Activations may also be detected merely based on a decrease in the forces measured by the strain gauges 48 due to the lost weight of the fluid that is dispensed with the activation.

Optionally, the processor and/or the memory are preprogrammed with software and/or firmware and/or data that controls how the information received from the strain gauges 48 is interpreted and/or used. The processor and/or memory may also be updated over time to modify and/or improve how the strain gauges 48 are used, for example with instructions communicated to the processor/memory via WiFi, Bluetooth, or Near Field Communication. In some embodiments of the invention, machine learning may be employed to modify and/or improve how the strain gauge 48 data is used, with for example feedback from maintenance staff being used to train the software to be able to better identify low fluid levels, cartridge 14 replacements, cartridge 14 types, dosage settings, and the like.

Figure 9:
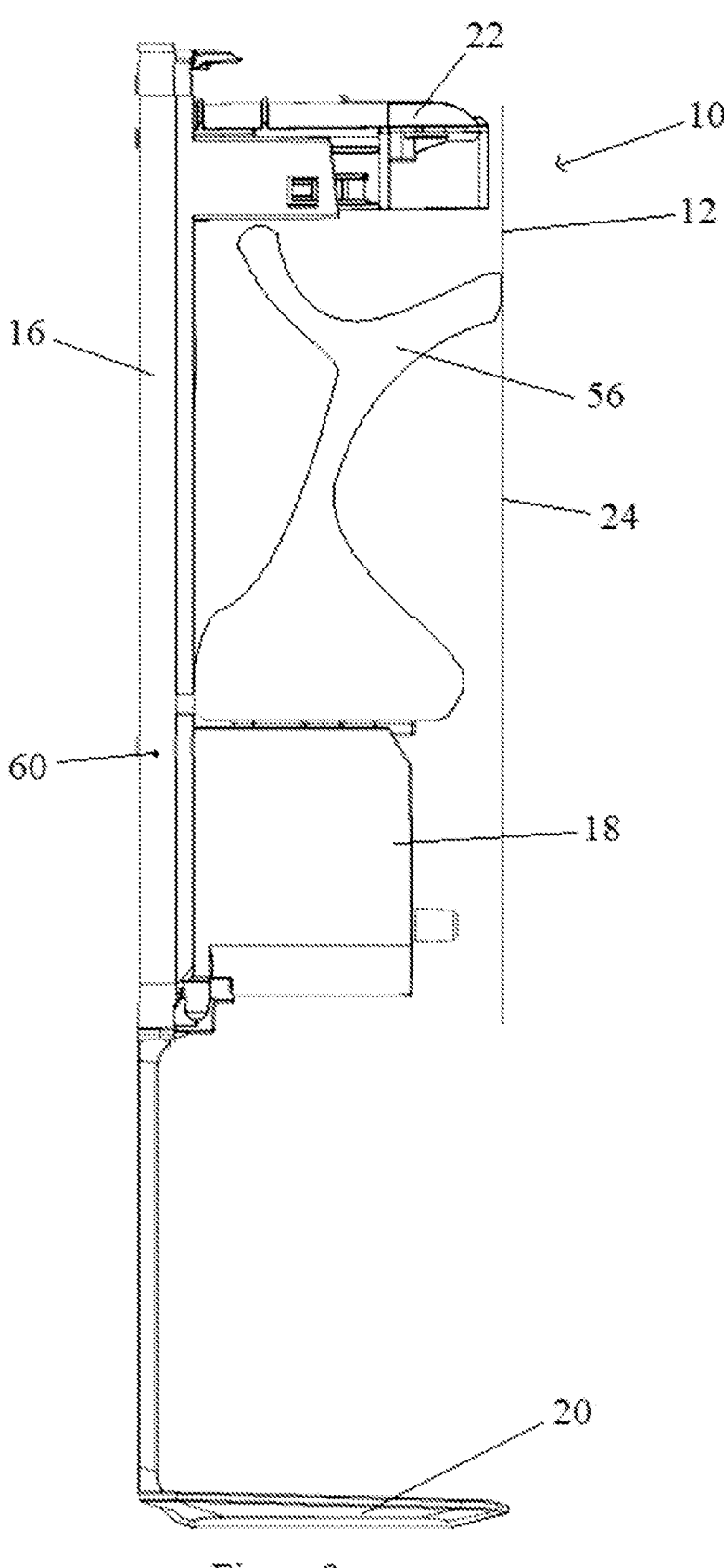
FIG. 9 is a side view of the hand cleaning fluid dispenser shown in FIG. 8, with a reservoir of the fluid dispenser in a partially collapsed state and only a front portion of the cover shown.
Figure 11:
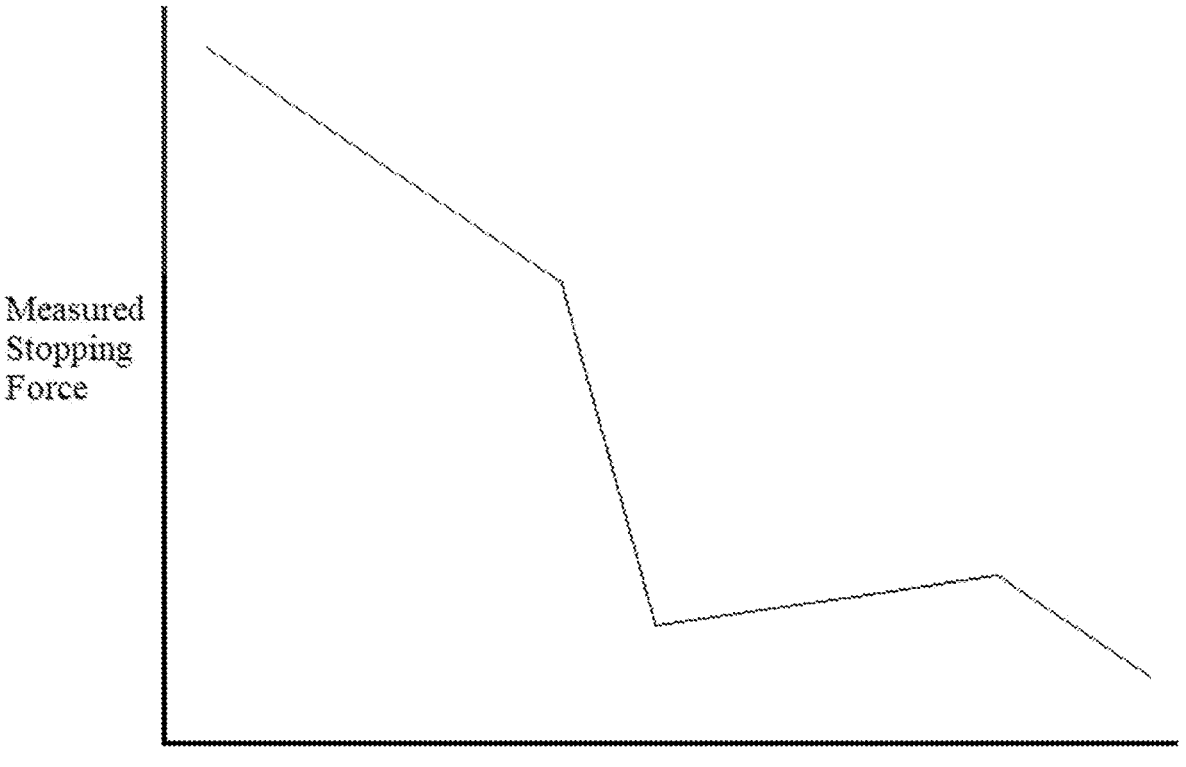
FIG. 11 is a line graph showing an example of a relationship between measured stopping force and volume of fluid dispensed for the fluid dispenser shown in FIG. 1 when a collapsible reservoir is used.
Figure 12:
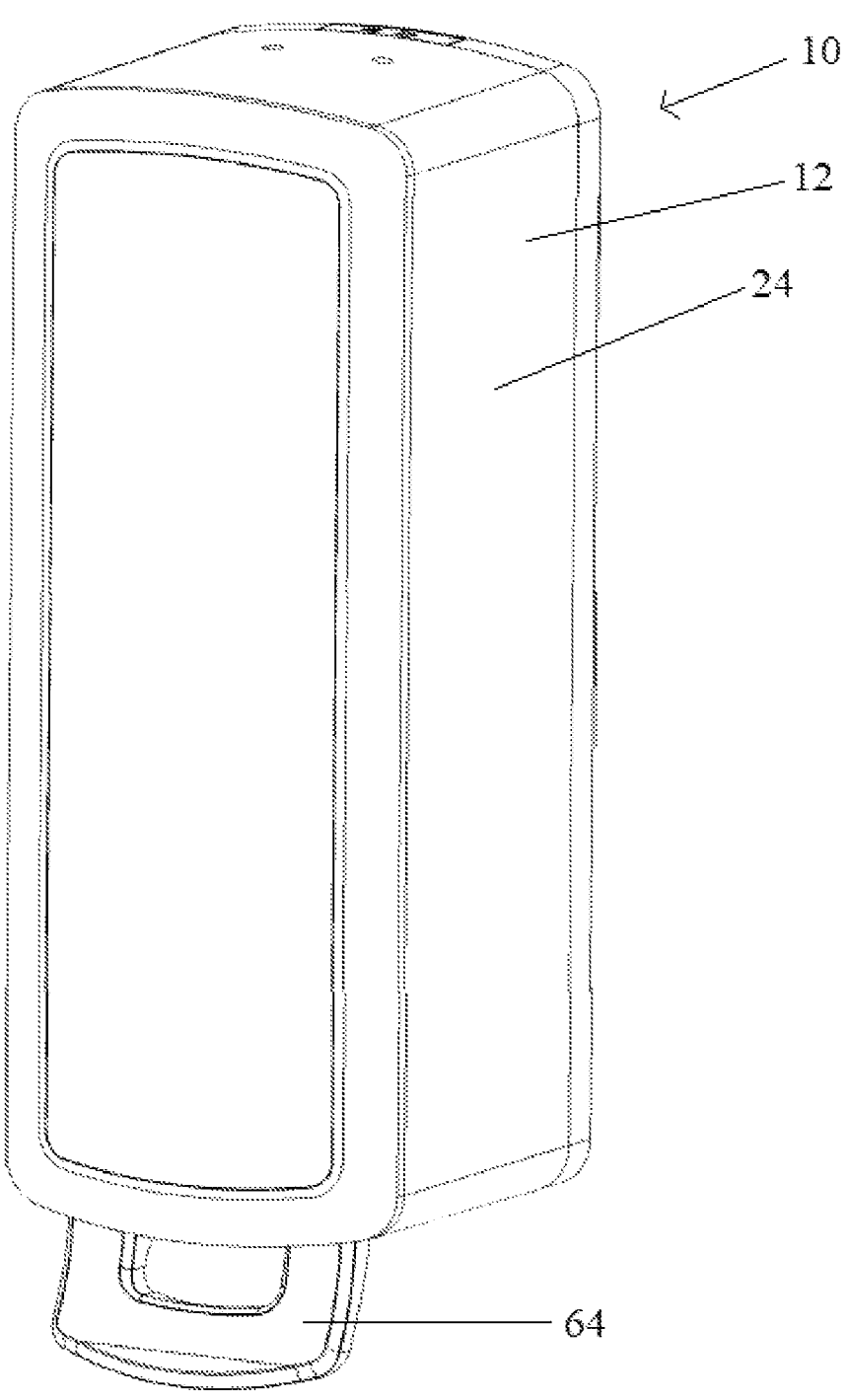
FIG. 12 is a perspective view of a hand cleaning fluid dispenser in accordance with a second embodiment of the present invention.

In some embodiments of the invention, the housing 12 is able to receive cartridges 14 in which the reservoir 56 collapses as fluid is dispensed therefrom, as is known in the art. As can be seen in FIG. 9, as the reservoir 56 collapses, the reservoir 56 may come into contact with the cover 24, or with other parts of the housing 12. The change in contact points between the reservoir 56 and the housing 12 as the reservoir 56 collapses can change the distribution of forces within the dispenser 10, such as by causing some of the weight of the reservoir 56 to be carried by the cover 24 rather than by the pump mounting body 18, or by causing additional forces to be exerted against the pump mounting body 18. This can affect the relationship between the stopping force measured by the strain gauges 48 and the volume of fluid dispensed from the cartridge 14, as can be seen in FIG. 11.

Figure 10:
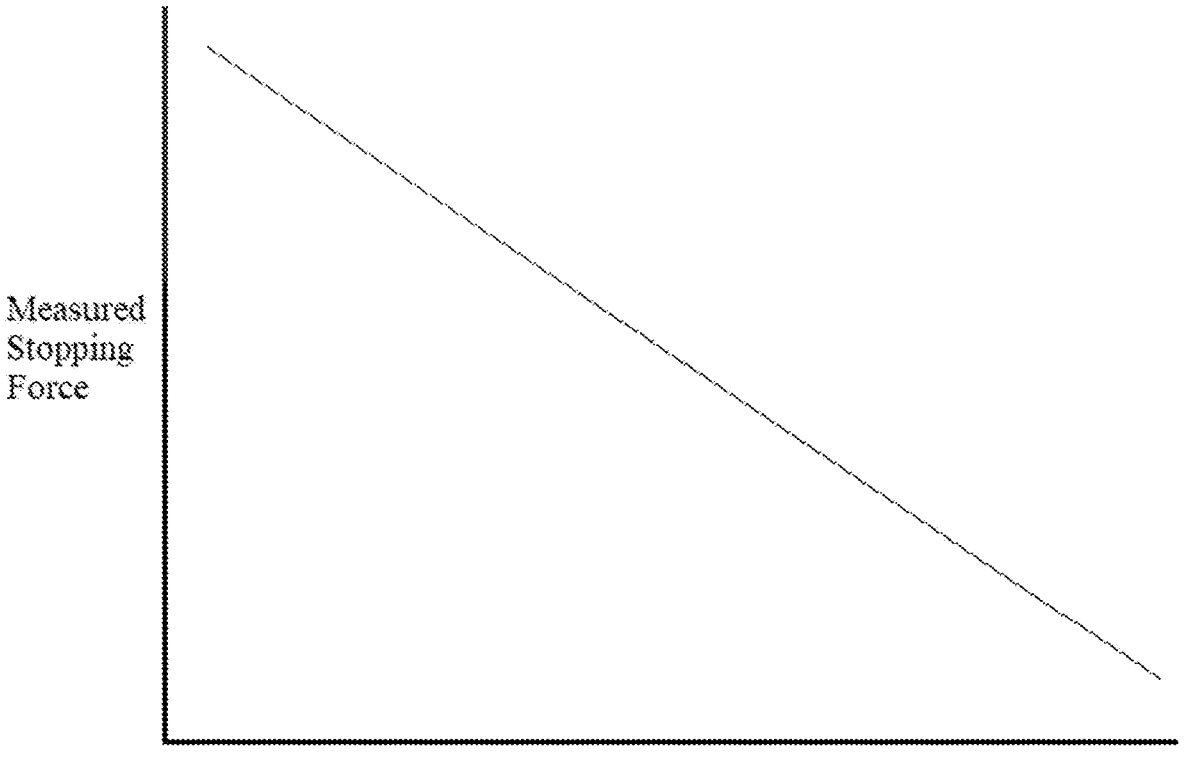
FIG. 10 is a line graph showing an example of a relationship between measured stopping force and volume of fluid dispensed for the fluid dispenser shown in FIG. 1 when a rigid reservoir is used.

An example of the relationship between the stopping force measured by the strain gauges 48 and the volume of fluid dispensed from a rigid cartridge 14 is shown in FIG. 10. As can been seen in FIG. 10, for a rigid cartridge 14 the relationship between the stopping force measured by the strain gauges 48 and the volume of fluid dispensed from the cartridge 14 is essentially linear, such that the volume of fluid dispensed can be calculated or estimated relatively easily based on the forces measured by the strain gauges 48. In contrast, as can be seen in FIG. 11, the relationship between the stopping force measured by the strain gauges 48 and the volume of fluid dispensed from a collapsible cartridge 14 may be more complicated and less predictable.

In order to more accurately track the fluid level in a collapsible reservoir 56, the processor is preferably configured to determine the dosage setting of the dispenser 10 during an initial set of dispensing events after the cartridge 56 is installed, and preferably before the reservoir 56 has collapsed to the point of coming into contact with the cover 24. The dosage setting can be determined in the manner as described above, by comparing a change in the measured stopping forces before and after one or more activations of the dispenser 10. Once the dosage setting has been determined, the processor is preferably configured to determine the volume of fluid remaining in the reservoir 56 by subtracting the known dosage each time the dispenser 10 is activated. This preferably allows the dispenser 10 to accurately track the amount of fluid remaining in the reservoir 56, even when the collapsing of the reservoir 56 interferes with the force measurements made by the strain gauges 48.

Preferably, the processor is also able to determine whether the reservoir 56 is collapsible or rigid based on the forces measured by the strain gauges 48. For example, if the forces steadily decrease in a linear fashion as fluid is dispensed, the processor can determine that the reservoir 56 is rigid; and if the forces rapidly change or change in a non-linear fashion, the processor can determine that the reservoir 56 is collapsible. This information can in turn be used to select or adjust an operating parameter of the dispenser 10, such as by having the processor identify a low fluid level for a rigid reservoir 56 based directly on the forces measured by the strain gauges 48, and identifying a low fluid level for a collapsible reservoir 56 based on the known or estimated initial volume of fluid in the reservoir 56, the determined dosage setting, and the number of dispenser activations.

Although the first embodiment of the invention described above is a touchlessly operated dispenser 10, the invention could also be used with a manually activated dispenser 10. An example of a manually operated dispenser 10 incorporating the invention is shown in FIGS. 12 to 15, in which like numerals are used to denote like components. The dispenser 10 shown in FIGS. 12 to 15 is very similar to the dispenser 10 shown in FIGS. 1 to 11. To avoid unnecessary repetition, only those features of the dispenser 10 shown in FIGS. 12 to 15 that differ substantially from the features of the dispenser 10 shown in FIGS. 1 to 11 will be described in detail below.

Figure 13:
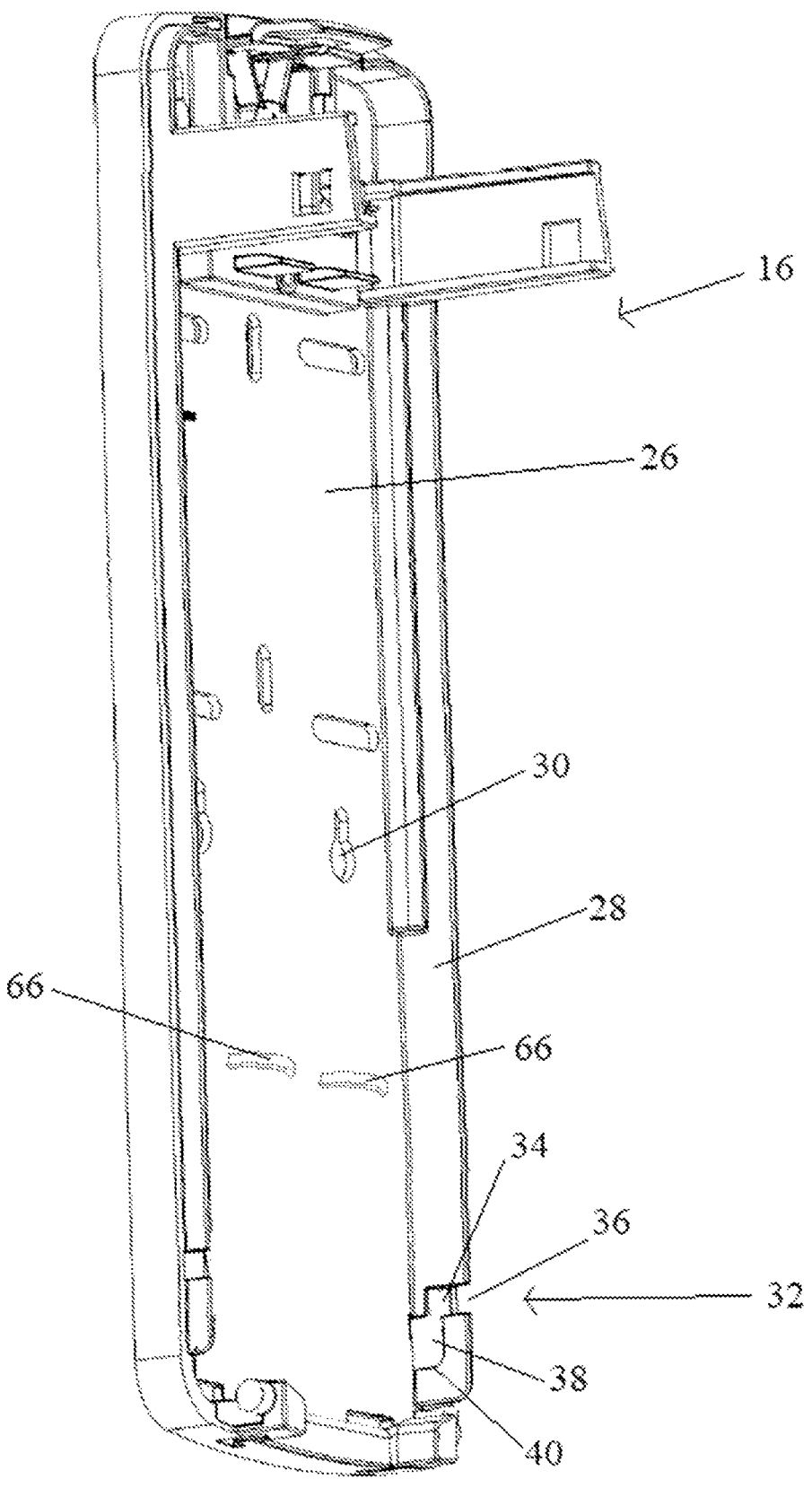
FIG. 13 is a perspective view of a back plate of the fluid dispenser shown in FIG. 12.

The dispenser 10 shown in FIGS. 12 to 15 includes an actuator lever 64, which is manually depressed to activate the fluid pump 58 in a manner as is known in the art. As can be seen in FIG. 13, the mounting channels 32 of the back plate 16 are located near the bottom of the back plate 16. The back plate 16 also has two attachment bands 66 that extend forwardly from the rear wall 26.

Figure 14:
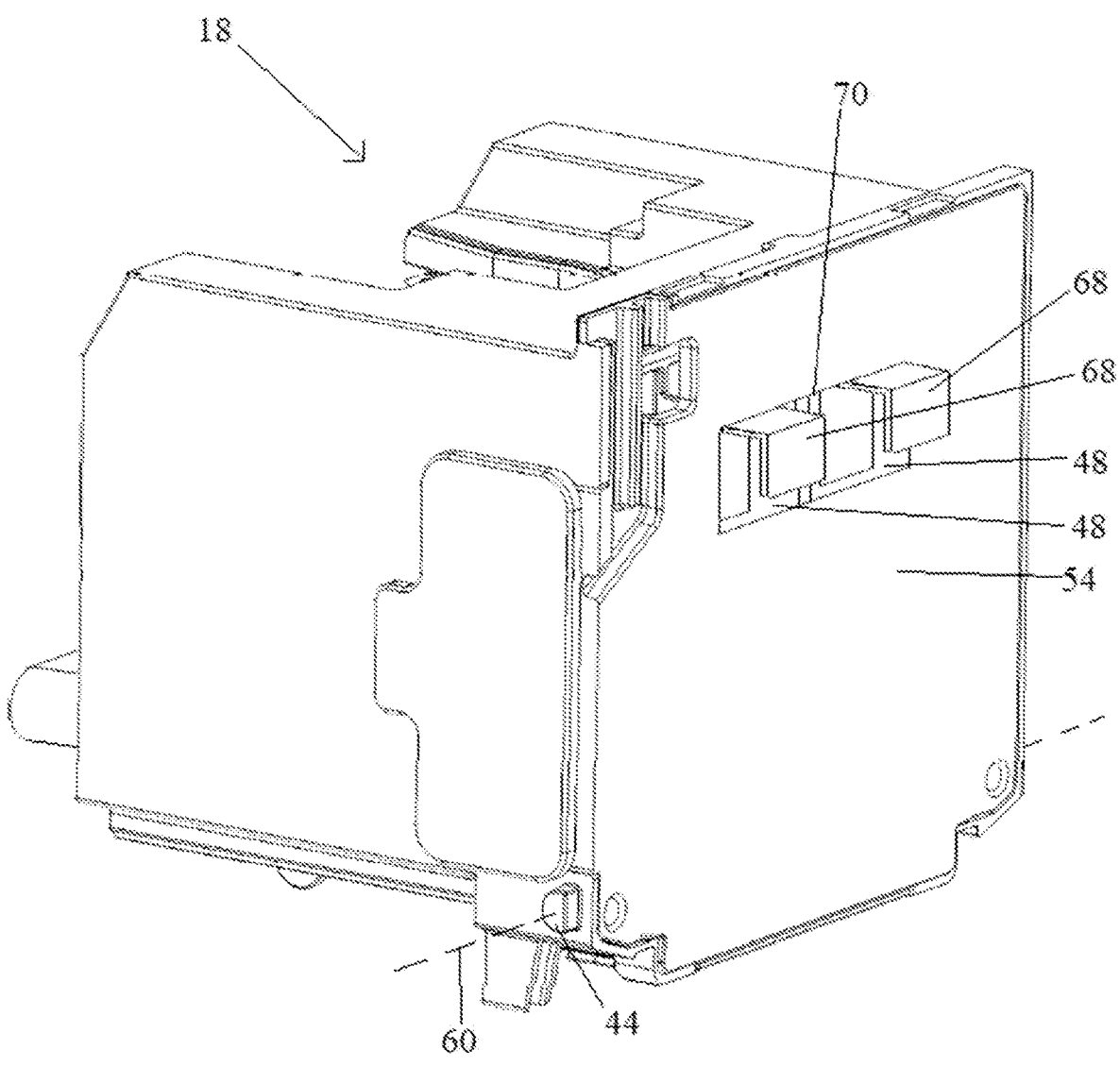
FIG. 14 is a rear perspective view of a pump mounting body of the fluid dispenser shown in FIG. 12.
Figure 15:
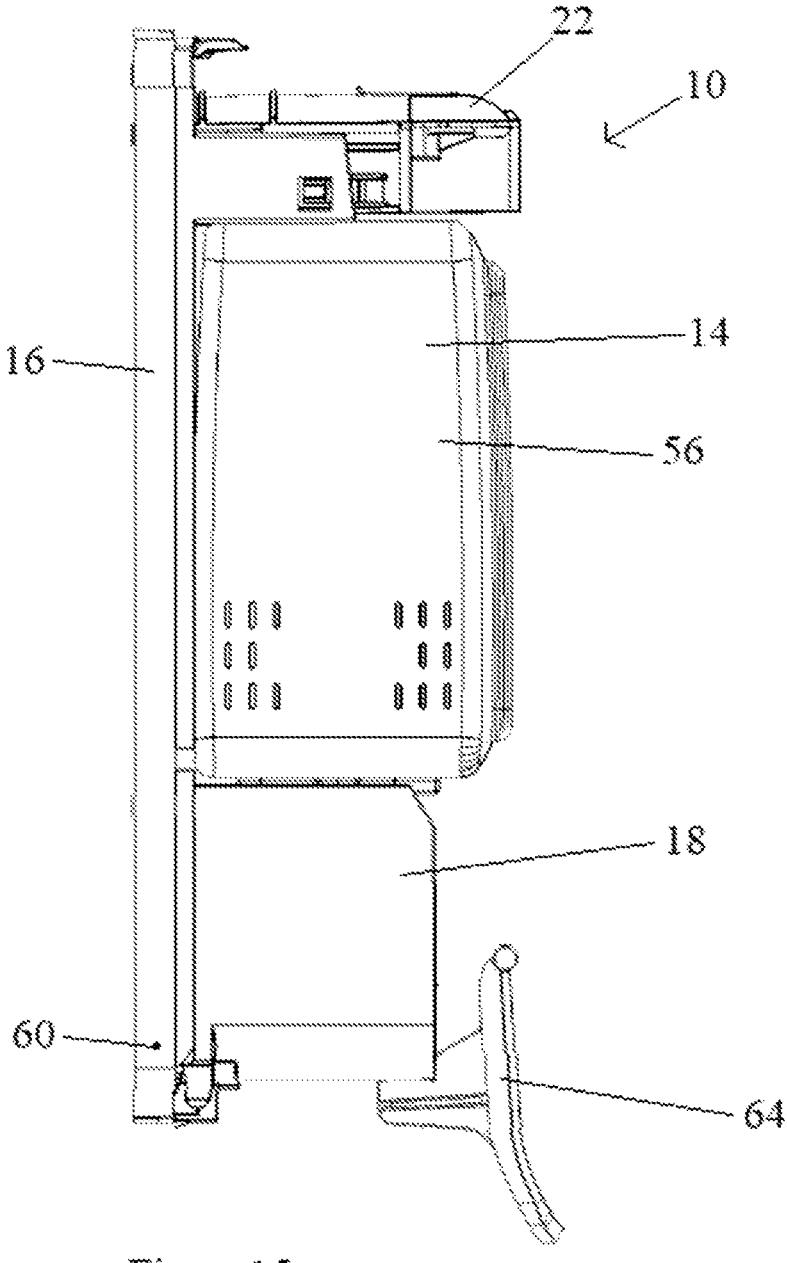
FIG. 15 is a side view of the fluid dispenser shown in FIG. 12, with a cover of the fluid dispenser omitted.

As can be seen in FIG. 14, the mounting fingers 44 are located at the rear bottom corners of the pump mounting body 18, rather than at the rear top corners as in the embodiment shown in FIGS. 1 to 11. As in the previous embodiment, the pump mounting body 18 includes two stain gauges 48 for detecting and measuring forces applied to the pump mounting body 18. As can be seen in FIG. 14, the strain gauges 48 have attachment hooks 68 that extend rearwardly through a rear opening 70 in the back wall 54 of the pump mounting body 18, in place of the bumpers 50 of the first embodiment. The attachment hooks 68 are configured to attach to the attachment bands 66 on the back plate 16.

As in the previous embodiment, the mounting fingers 44 are configured to be received by the mounting channels 32 in a manner that, but for the attachment of the attachment hooks 68 to the attachment bands 66, would permit the pump mounting body 18 to pivot about a pivot axis 60 relative to the back plate 16. As can be seen by comparing FIGS. 8 and 15, the pivot axis 60 is lower in the embodiment shown in FIGS. 12 to 15 than it is in the embodiment shown in FIGS. 1 to 11. The pivot axis 60 is preferably positioned at approximately the same height as the actuation lever 64, which helps to insulate the strain gauges 48 from any excessive forces that might be applied to the dispenser 10 when the lever 64 is manually activated.

As in the previous embodiment, the weight of the fluid cartridge 14, as well as the weight of the pump mounting body 18 itself, biases the pump mounting body 18 to pivot downwardly about the pivot axis 60. The attachment of the attachment hooks 68 to the attachment bands 66 prevents the pump mounting body 18 from pivoting away from the back plate 16, with the magnitude of the force applied by the attachment bands 66 to the attachment hooks 68 being proportional to the weight of the fluid cartridge 14. As in the previous embodiment, the stopping force preventing the pump mounting body 18 from pivoting about the pivot axis 60 is detected and measured by the strain gauges 48, and can be used to calculate and/or estimate the amount of fluid remaining in the fluid reservoir 56.

The data received from the strain gauges 48 may be used in all of the same ways as in the first embodiment of the invention described above. Furthermore, although the positioning of the pivot axis 60 at approximately the same height as the actuation lever 64 is advantageous for protecting the strain gauges 48 from damage that might result from excessive forces applied on manual activation, this is not strictly necessary, and the positioning of the pivot axis 60 shown in FIGS. 1 to 11 could also be used with a manually activated dispenser 10.

Figure 16:
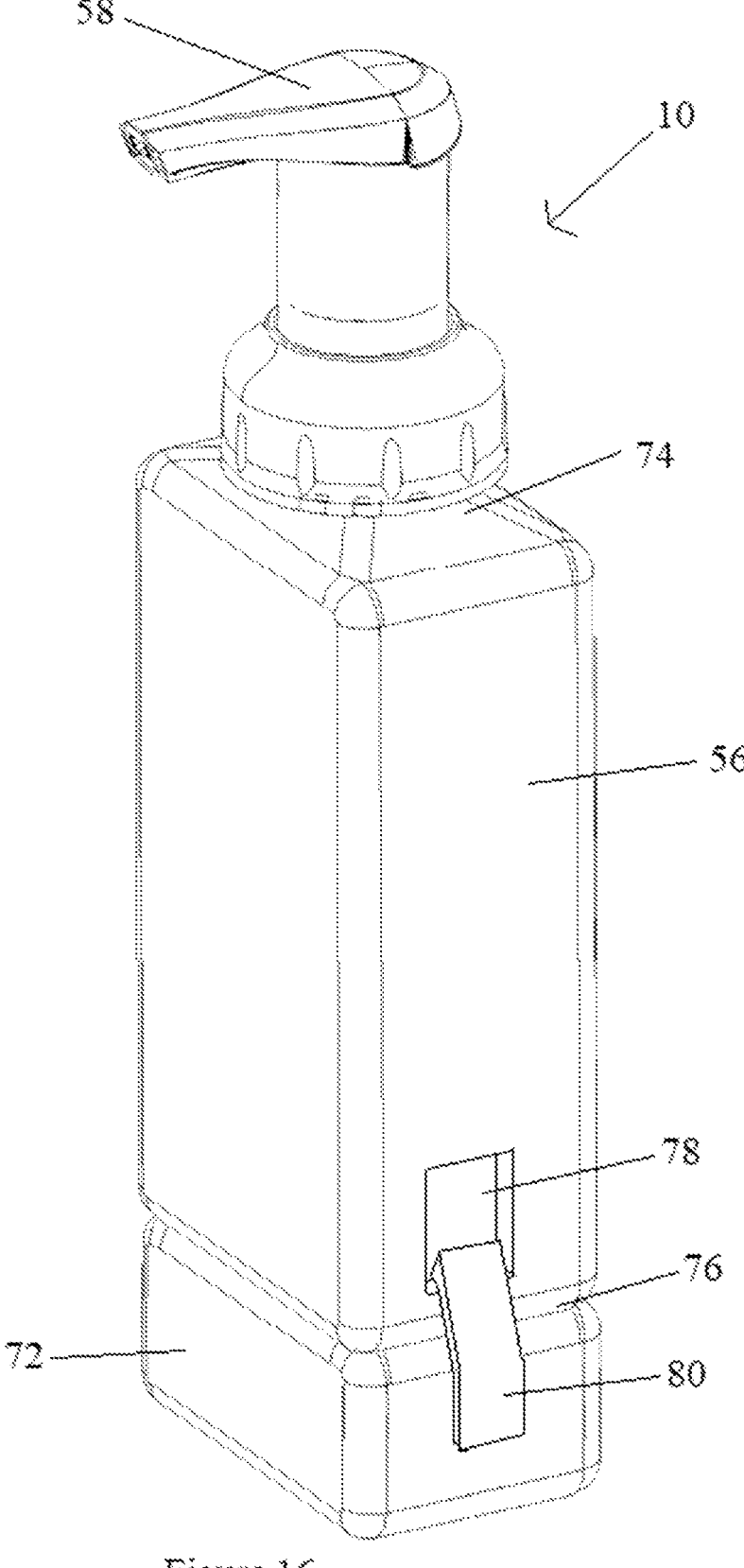
FIG. 16 is a perspective view of a hand cleaning fluid dispenser in accordance with a third embodiment of the present invention.

Reference is now made to FIG. 16, which shows a fluid dispenser 10 in accordance with a third embodiment of the present invention Like numerals are used to denote like components.

The fluid dispenser 10 shown in FIG. 16 includes a fluid reservoir 56, a fluid pump 58, and a smart base 72. The fluid reservoir 56 contains a supply of the fluid to be dispensed, and has an open top end 74 for receiving the fluid pump 58. Fluid can be dispensed from the dispenser 10 by pressing manually downwardly on the fluid pump 58 in a manner as is known in the art.

The reservoir 56 has a bottom end 76 that rests on the smart base 72. As can be seen in FIG. 16, the right side of the reservoir 56 has an indented portion 78 near the bottom end 76. Although not visible, the left side of the reservoir 56 also has an indented portion 78. The indented portions 78 are configured to receive a pair of fastening arms 80 that extend upwardly from the smart base 72, though only one fastening arm 80 is visible in FIG. 16. The engagement of the fastening arms 80 with the indented portions 78 holds the reservoir 56 and the smart base 72 together, for example when the fluid dispenser 10 is lifted off of a table top or other horizontal support structure.

The smart base 78 preferably includes various electronics, including one or more strain gauges 48, a processor, a memory, a communication device, and a power supply. The strain gauges 48 are configured to detect the downwards force applied to the smart base 78 by gravity pulling the fluid reservoir 56 and the fluid pump 58 downwardly. Preferably, the fastening arms 80 fit somewhat loosely into the indented portions 78 and do not exert a force pulling the reservoir 56 and the smart base 72 together when the reservoir 56 is resting on the smart base 78. Alternatively, the strain gauges 48 could be mounted to feet of the smart base 78, with the smart base 48 being supported by the feet above a support surface. In this case, the connection between the smart base 78 and the reservoir 56 could be rigid. As in the previous embodiments, the magnitude of the forces detected and measured by the strain gauges 48 are proportional to the amount of fluid contained in the reservoir 56, and can be used to calculate and/or estimate the level of fluid in the reservoir 56.

The smart base 72 may, for example, be able to detect when the level of fluid within the reservoir 56 is running low, and provide a notification indicating the low fluid level. The indication could, for example, be in the form of a light on the smart base 72 that is illuminated and/or a message sent to maintenance staff via e-mail or text message indicating that the fluid reservoir 56 needs to be refilled or replaced.

The smart base 72 could be configured to perform all of the same functions as in the previous embodiments already described. Preferably, the smart base 72 is removable from the reservoir 56 by biasing the fastening arms 80 outwardly out of engagement with the indented portions 78, and lifting the reservoir 56 away from the smart base 72. The smart base 72 can then be attached to a new reservoir 56 and pump 58 by sliding the new reservoir 56 between the fastening arms 80 until they are received by the indented portions 78, preferably in a snap fit.

Activation of the dispenser 10 can be detected and recorded by the smart base 72 by detecting an increase in the downwards force applied to the smart base 72 when the fluid pump 58 is manually depressed. Data from the smart base 72 may be processed and stored locally by the processor and the memory, and/or may be communicated to external computers/servers such as by WiFi, Bluetooth, and/or NFC.

The smart base 72 may, for example, be able to detect when the fluid dispenser 10 is lifted off of a support surface, by detecting a sudden decrease in the force applied to the smart base 72. The smart base 72 may furthermore be configured to check the fluid level within the reservoir 56 each time the dispenser 10 is lifted and then set down again, to for example detect any fluid dispensed from the dispenser 10 while the dispenser 10 was lifted away from the support surface.

Optionally, the smart base 72 includes a timer, and is able to group activations of the dispenser 10 that occur in rapid succession into single usage events which are recorded and/or transmitted to a server. Optionally, the smart base 72 is able to detect the identity of an individual using the dispenser 10, for example by communicating with a smart phone, a smart watch, an electronic identification e.g. a Bluetooth Low Energy (BLE) ID badge, or another type of communication device carried by the individual. This information can then be stored and/or communicated to the server, for example to monitor compliance with a hand cleaning protocol. All of these functions could also be incorporated into any of the other embodiments of the invention described herein.

The smart base 72 is preferably able to receive a variety of different reservoir 56 types and sizes, and is able to identify the type of reservoir 56 based on its weight.

Figure 17:
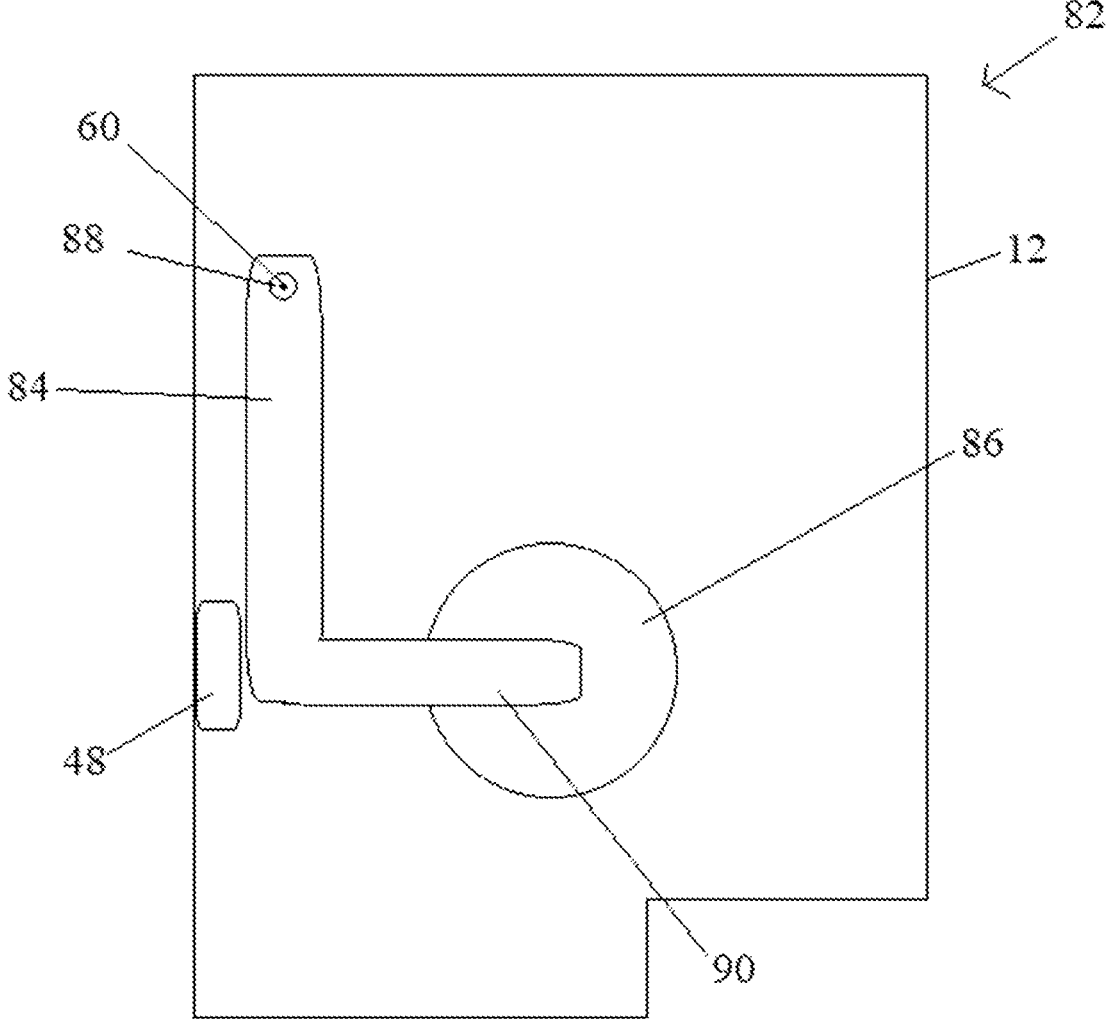
FIG. 17 is a schematic side view of a toilet paper dispenser in accordance with a fourth embodiment of the present invention.

The invention is not limited to fluid dispensers 10, but could also be used with any other type of dispenser or product whose fill level may be desirable to measure. For example, an embodiment of the invention in the form of a toilet paper dispenser 82 is shown schematically in FIG. 17. Like numerals are used to denote like components.

The toilet paper dispenser 82 includes a housing 12, an internal frame 84, a toilet paper roll 86, and a strain gauge 48. The internal frame 84 is generally L shaped, with a pivoting attachment 88 to the housing 12 located at the top of the frame 84 that allows the frame 84 to pivot relative to the housing 12 about a pivot axis 60. The internal frame 84 also has horizontal arms 90 that carry the toilet paper roll 86, and which allow the toilet paper roll 86 to rotate to dispense toilet paper.

The strain gauge 48 is mounted to the housing 12 adjacent to a lower corner portion of the frame 84, such that the weight of the frame 84 and the toilet paper roll 86 causes the frame 84 to pivot into engagement with the strain gauge 48. As in the previous embodiments, the forces detected and measured by the strain gauge 48 are proportional to the weight of the product, in this case the toilet paper roll 86. The force measurements can thus be used to calculate and/or estimate the quantity of toilet paper remaining on the roll 86. As in the previous embodiments, this information can be used to track usage of the dispenser 82 and to provide an indication/notification when the level of toilet paper is running low and needs to be refilled.

The data from the strain gauge 48 may be used in all of the same ways as in the previous embodiments, including determining a low product level and detecting dispensing events based on characteristic changes in the forces measured by the strain gauge 48. The data may be processed locally by a processor and/or communicated to an external computer/server.

Optionally, the frame 84 could be configured to carry more than one toilet paper roll 86 at a time, with the forces detected by the strain gauge 48 providing an indication of the total amount of toilet paper remaining in the dispenser 82. Optionally, the data from the strain gauge 48 could be used together with data from other sensors, such as optical sensors, that provide information about the quantity of rolls 86 stored in the dispenser 82.

Optionally, in a multi-roll dispenser 82, the processor could be configured to recognize an automatic change of an empty roll 86 to the next full roll 86 when the strain gauge 48 detects a unique force spike pattern. A secondary sensor for detecting when the rolls 86 change could also be used.

Figure 18:
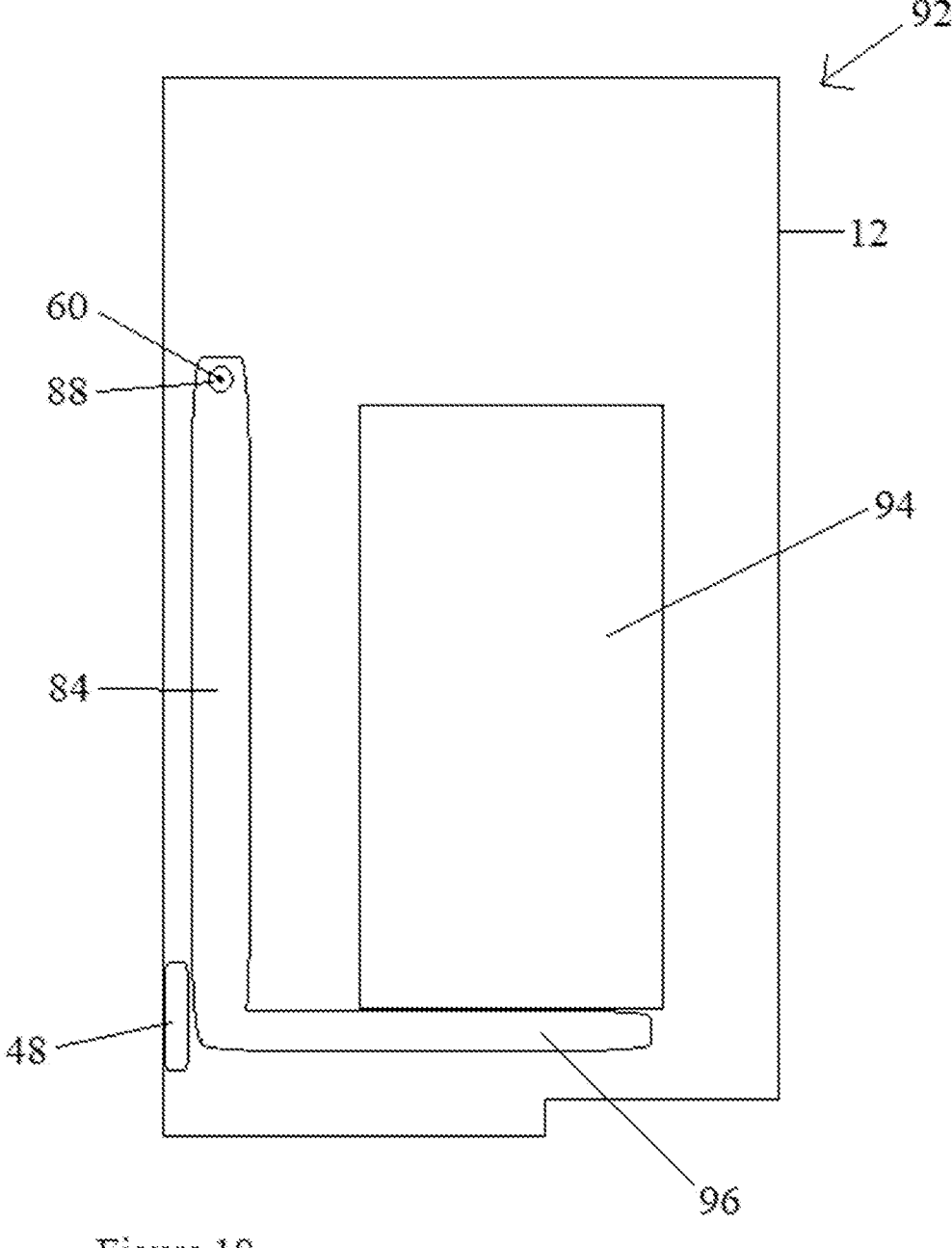
FIG. 18 is a schematic side view of a paper towel dispenser in accordance with a fifth embodiment of the present invention.

A further embodiment of the invention in the form of a paper towel dispenser 92 is shown in FIG. 18. Like numerals are used to denote like components.

The paper towel dispenser 92 has a housing 12, an internal frame 84, a strain gauge 48, and a stack of paper towels 94. The internal frame 84 has a generally L like shape, with a pivoting attachment 88 to the housing 12 located at the top of the frame 84 that allows the frame 84 to pivot relative to the housing 12 about a pivot axis 60. The internal frame 84 also has a horizontal portion 96 that carries the stack of paper towels 94.

As in the previous embodiment, the strain gauge 48 is mounted to the housing 12 adjacent to a lower corner portion of the frame 84, such that the weight of the frame 84 and the paper towels 94 causes the frame 84 to pivot into engagement with the strain gauge 48. As in the previous embodiments, the forces detected and measured by the strain gauge 48 are proportional to the weight of the product, in this case the stack of paper towels 94. The force measurements can thus be used to calculate and/or estimate the quantity of paper towels 94 remaining in the dispenser 92. The data from the strain gauge 48 may be used in all of the same ways as in the previous embodiments. The paper towel dispenser 92 could dispense paper towels manually or automatically, in a manner as is known in the art.

Figure 19:
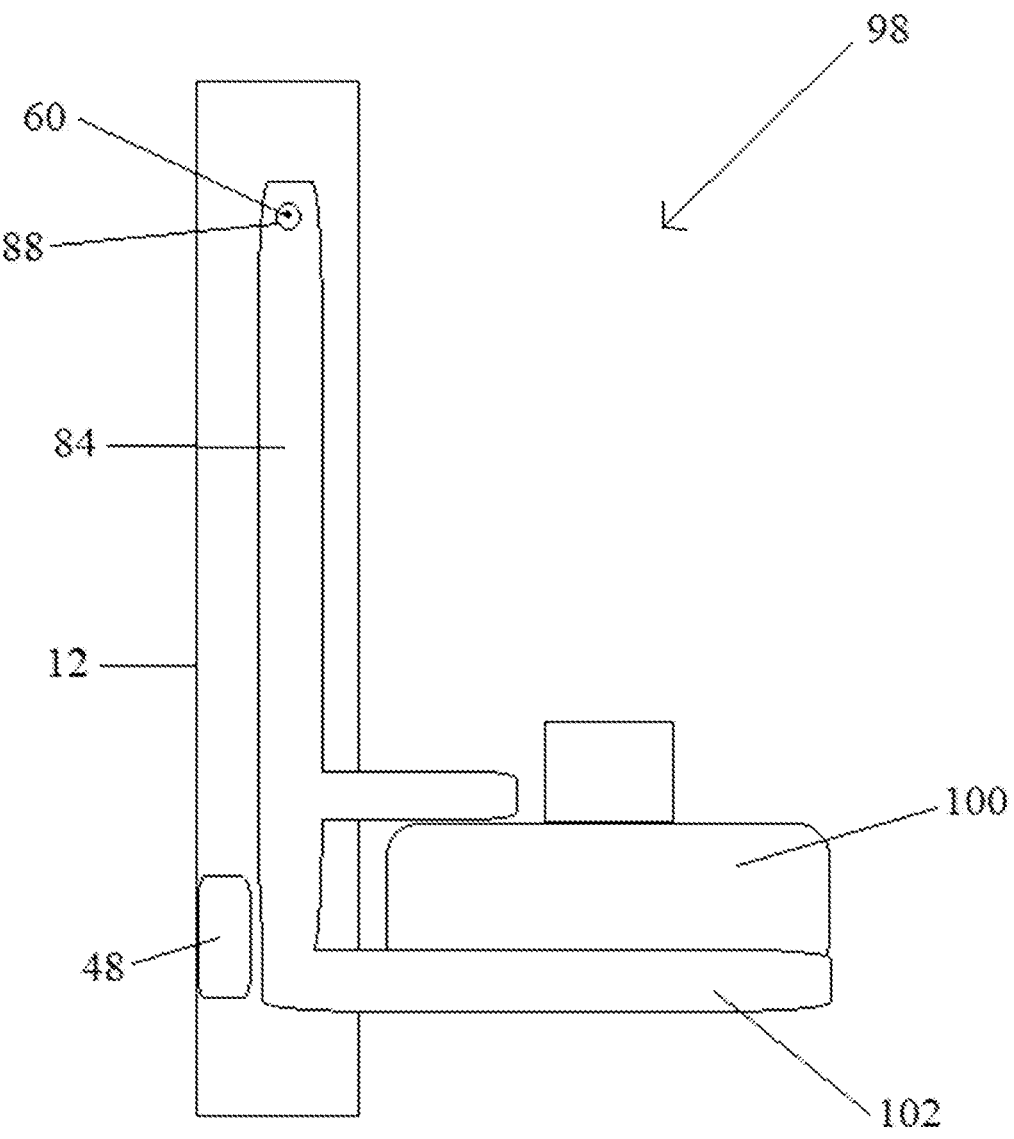
FIG. 19 is a schematic side view of a wipe dispenser in accordance with a sixth embodiment of the present invention.

A further embodiment of the invention in the form of a wipe dispenser 98 is shown in FIG. 19. Like numerals are used to denote like components.

The wipe dispenser 98 has a housing 12, a frame 84, a strain gauge 48, and a pack of wipes 100. The frame 84 has a pivoting attachment 88 to the housing 12 located at the top of the frame 84 that allows the frame 84 to pivot relative to the housing 12 about a pivot axis 60. The frame 84 also has a horizontally extended wipe carrying portion 102 that carries the pack of wipes 100.

As in the previous embodiment, the strain gauge 48 is mounted to the housing 12 adjacent to a lower corner portion of the frame 84, such that the weight of the frame 84 and the pack of wipes 100 causes the frame 84 to pivot into engagement with the strain gauge 48. As in the previous embodiments, the forces detected and measured by the strain gauge 48 are proportional to the weight of the product, in this case the pack of wipes 100. The force measurements can thus be used to calculate and/or estimate the quantity of wipes remaining in the dispenser 98. The data from the strain gauge 48 may be used in all of the same ways as in the previous embodiments.

Figure 20:
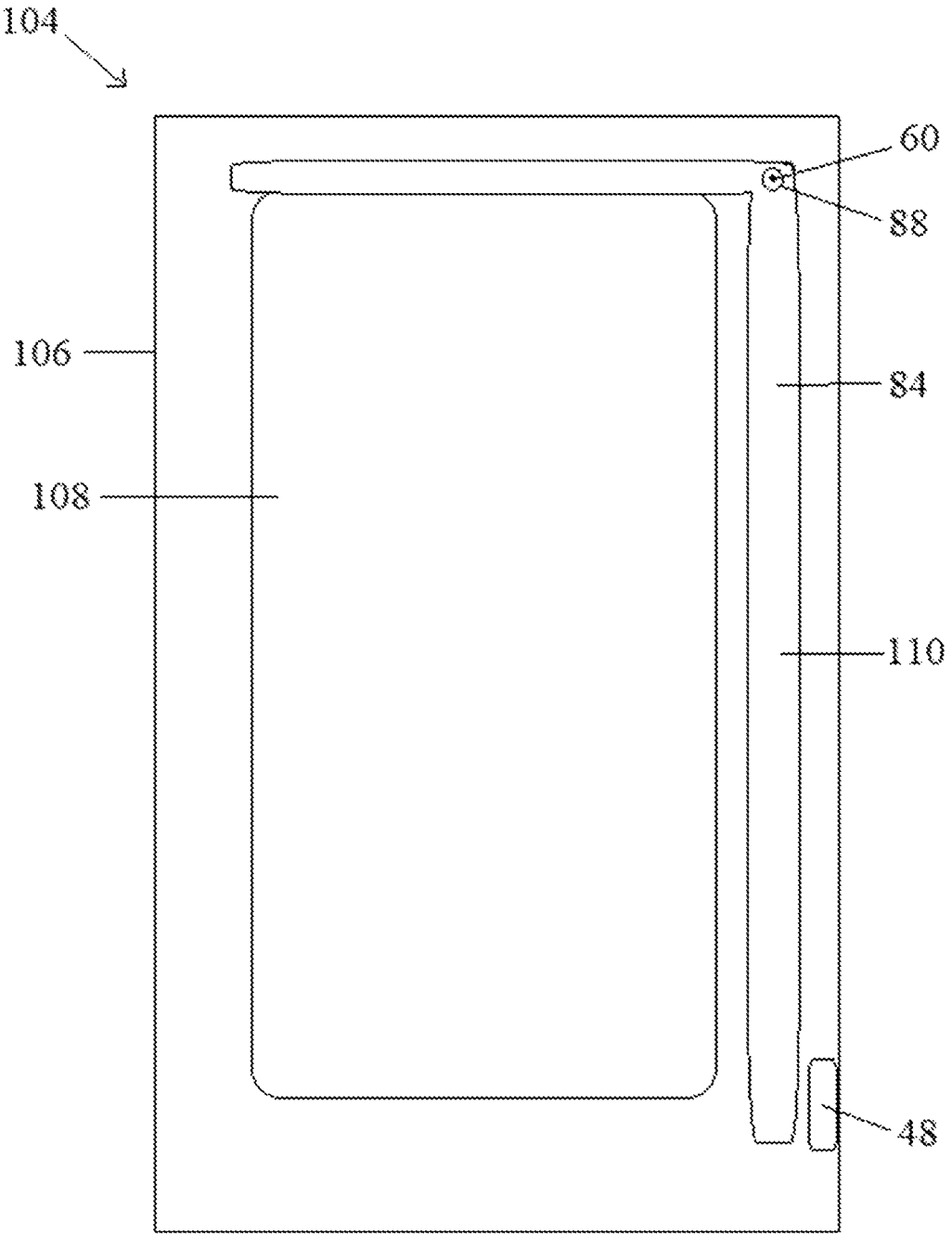
FIG. 20 is a schematic side view of a waste bin in accordance with a seventh embodiment of the present invention.

Reference is now made to FIG. 20, which schematically shows a waste bin 104 in accordance with a further embodiment of the invention Like numerals are used to denote like components.

The waste bin 104 includes a receptacle 106, an internal frame 84, a strain gauge 48, and a bag 108. The receptacle 106 has an open top to allow users to deposit waste into the bag 108, which is suspended by the frame 84. The frame 84 has a pivoting attachment 88 to the receptacle 106 near the open top, which allows the frame 84 to pivot about a pivot axis 60 relative to the receptacle 106. The frame 84 also has a vertically extended portion 110 that extends downwardly from the attachment 88 towards a bottom end of the receptacle 106.

The strain gauge 48 is mounted to the receptacle 106 near the bottom end of the receptacle 106, adjacent to the vertically extended portion 110 of the frame 84. Similarly to the previous embodiments, the weight of the bag 108 and the frame 84 causes the vertically extended portion 110 to pivot about the pivot axis 60 into engagement with the strain gauge 48, with the magnitude of the forces detected and measured by the strain gauge 48 being proportional to the weight of the bag 108. The measurements from the strain gauge 48 can thus be used to calculate or estimate the quantity of waste that has been deposited in the bag 108, with the forces increasing as the quantity of waste increases. This information can be used to track usage of the waste bin 104, and/or to provide a notification when the waste bin 104 is almost full and needs to be emptied. The information from the strain gauge 48 may be used in the same ways as in all of the previous embodiments.

Optionally, the waste bin 104 could incorporate additional sensors, such as sensors that detect when waste passes through the open top of the receptacle 106. The strain gauge 48 could, for example, be configured to measure the weight of the bag 108 continuously, periodically, and/or whenever waste passing through the open top is detected. The receptacle 106 optionally includes an indicator, such as an array of lights or a screen, which displays the fill level of the waste bin 104.

Figure 21:
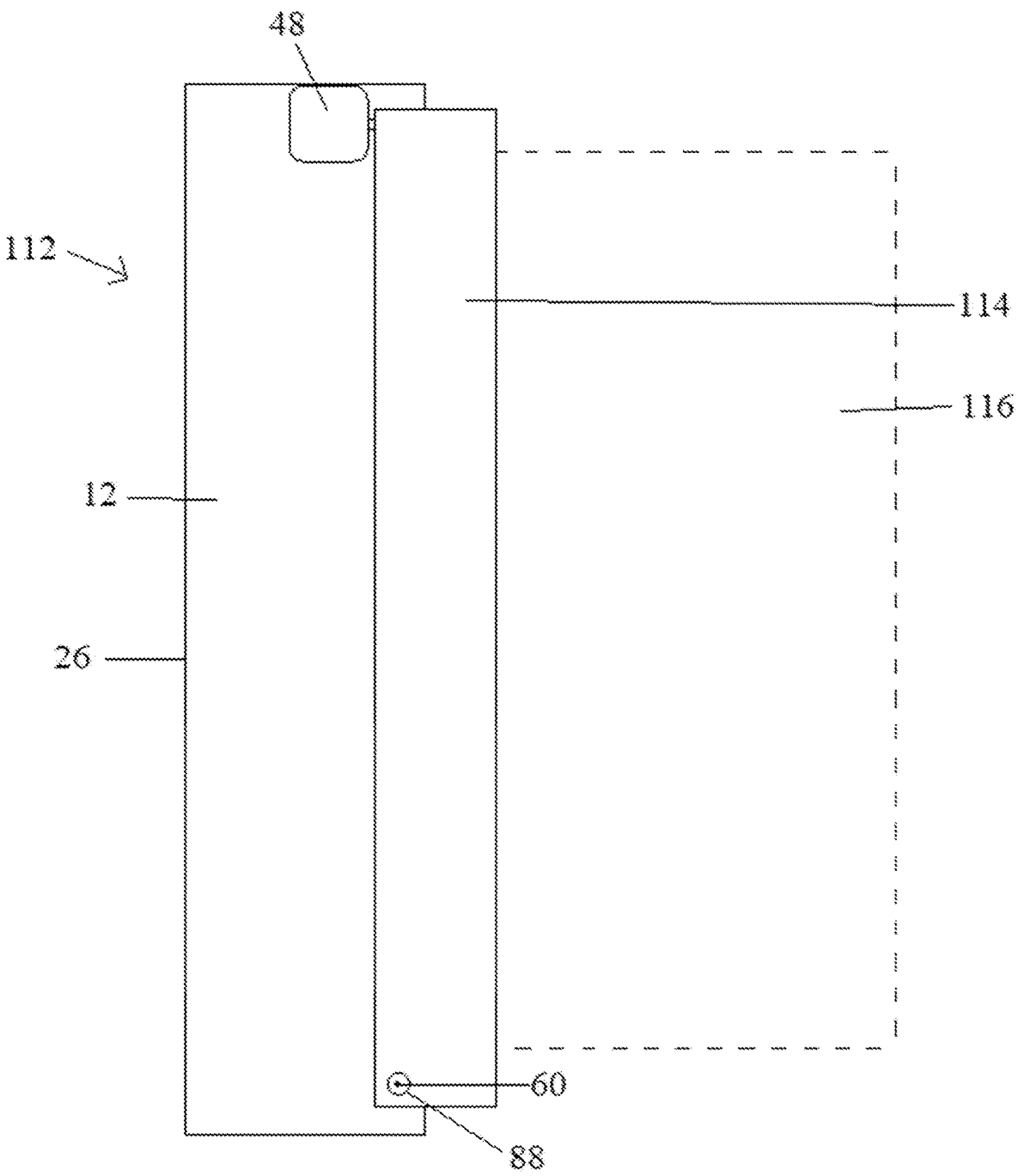
FIG. 21 is a schematic side view of a universal mount in accordance with an eighth embodiment of the present invention.

Reference is now made to FIG. 21, which depicts a universal mount 112 in accordance with a further embodiment of the invention Like numerals are used to denote like components.

The universal mount 112 includes a housing 12, an attachment plate 114, and a strain gauge 48. The housing 12 has a rear wall 26 that is configured to be attached to a vertical support structure, such as a wall or a post. The attachment plate 114 is connected to the front of the housing 12 by a pivoting attachment 88 near the bottom of the attachment plate 114, which permits the attachment plate 114 to pivot about a pivot axis 60 relative to the housing 12. The front of the attachment plate 114 has one or more connectors for connecting a device 116 to the attachment plate 114. The connectors may, for example, be in the form of apertures for receiving screws or other fasteners, or loops for receiving hooks. The attachment plate 114 is preferably able to connect to and support a wide variety of different devices 116, including but not limited to: fluid dispensers, toilet paper dispensers, paper towel dispensers, wipe dispensers, waste bins, and glove dispensers.

The strain gauge 48 is attached to the housing 12, and is connected to the top of the attachment plate 114 in a manner such that the strain gauge 48 is able to detect and measure forces pulling the top of the attachment plate 114 away from the strain gauge 48. Similarly to the previous embodiments, the forces detected and measured by the strain gauge 48 are proportional to the weight of the device 116 connected to the attachment plate 114.

The universal mount 112 preferably includes various electronic components, such as batteries, a processor, a memory, and a communication device, that are able to process, store, and communicate data received from the strain gauge 48. Preferably, the processor and/or external computers/servers are configured to determine what type of device 116 has been attached to the attachment plate 114 by analyzing the data received from the strain gauge 48. For example, the initial weight of the device 116 when first attached to the attachment plate 114 may provide information about the type of device 116 that has been connected. Information such as patterns of use, characteristic patterns of force changes during use, the weight of the product dispensed with each use, and the weight of the device 116 when empty may provide further information about what type of device 116 has been connected. The information may be processed by computer algorithms, including optionally machine learning algorithms, to determine what type of device 116 has been connected. Alternatively, maintenance staff could input information identifying the device 116 to the processor and/or external servers, e.g. using WiFi, Bluetooth, or NFC.

The information from the strain gauge 48 may be used to provide all of the same functionalities as in the previous embodiments, such as detecting low product levels and providing a notification when a refill is required; detecting usage events; and detecting dosage settings. The universal mount 112 is preferably able to carry virtually any type of device 116 that experiences weight changes or force changes when the device 116 is used, such as when products are removed and/or deposited in the device 116. Using data from the strain gauge 48, the universal mount 112 is preferably able to give smart functionalities to virtually any such device 116.

The universal mount 112 could also be placed in a horizontal orientation, with the weight of the device 116 pushing downwardly on the strain gauge 48. The processor is preferably able to determine whether the universal mount 112 is mounted horizontally or vertically based on whether the attachment plate 114 is being pushed into the strain gauge 48 (horizontal) or pulled away from the strain gauge 48 (vertical).

Figure 22:
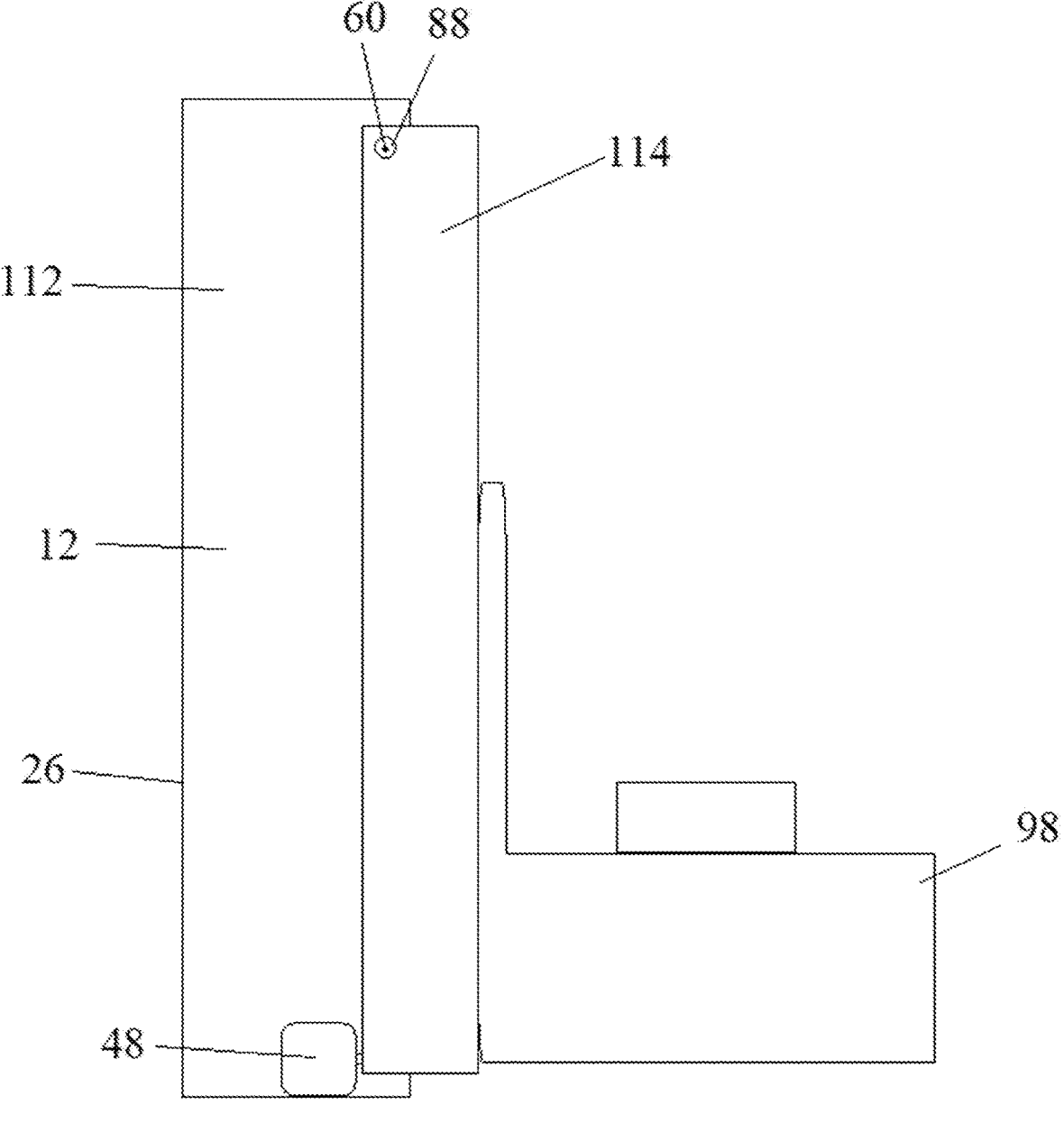
FIG. 22 is a schematic side view of a smart mount and a wipe dispenser in accordance with a ninth embodiment of the present invention.

Reference is now made to FIG. 22, which shows a smart mount 112 and a wipe dispenser 98 in accordance with a ninth embodiment of the present invention Like numerals are used to denote like components.

The smart mount 112 shown in FIG. 22 is identical to the universal mount 112 shown in FIG. 21, with the exception that the pivoting attachment 88 is located at the top of the attachment plate 114 and the strain gauge 48 is located at the bottom of the attachment plate 114. As in the previous embodiments, the force exerted against the strain gauge 48 is proportional to the weight of a product/device attached to the attachment plate 114. The mount 112 is able to perform all of the same functions as in the previously described embodiments.

The wipes dispenser 98 is attached to the attachment plate 114, for example using a fastener such as a screw. As wipes are removed from the dispenser 98, the weight of the wipes dispenser 98 decreases, which is detected by the strain gauge 48. As in the previous embodiments, this information can be used to detect when the level of wipes is running low, for example, and to provide a notification when the wipes need to be replenished. The pattern of forces exerted on the strain gauge 48 when a wipe is being removed from the dispenser 98 can also preferably be detected and recognized, so that dispensing events can be identified and recorded.

Optionally, the mount 112 may be packaged and sold together with the wipes dispenser 98 as a single unit. The mount 112 could also be packaged and sold together with any other type of dispenser. Alternatively, the mount 112 may be sold separately as a universal mount 112, which can attach to a variety of different devices. In some cases, it may be preferable for the strain gauge 48 to be located at the bottom of the attachment plate 114, as shown in FIG. 22, such as for touchless dispensers, wipe dispensers 98, glove dispensers, or hair net dispensers. In other cases it may be preferable for the strain gauge 48 to be located at the top of the attachment plate 114, as shown in FIG. 21, such as for manual dispensers, to protect the strain gauge 48 from excessive forces that might be encountered during manual activation of the dispenser.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the particular structures of the preferred embodiments that have been shown in the drawings. Rather, any suitable structure in which the strain gauge 48 is able to detect and measure the weight of the product/device could be used.

In some preferred embodiments, the invention uses a strain gauge amplifier that is connected to two load cells. The invention is not limited to the use of strain gauges 48. Rather, any suitable load cell or sensor for detecting and measuring forces could be used. In some preferred embodiments, two strain gauges 48 are provided per dispenser 10 in a half Wheatstone bridge configuration. This preferably provides temperature compensation as well as allowing for simple and more robust mechanical fixturing options, and averaging between the two sensors.

Use of sensors that measure forces/weight advantageously allows the product level to be determined independently of product viscosity, color, conductivity or other factors that could influence optical or capacitive level sensing.

In some embodiments of the invention, the processor is able to detected attempts to dispense product from the dispenser 10, such as by detecting the force applied by manual activation of the dispenser 10, or by any other suitable sensor arrangement that could be used. The processor is further configured to compare the product weight before the activation and after the activation, to determine whether any product was actually dispensed. If the weight of the product does not change after a dispensing event, this may indicate that the dispenser 10 is malfunctioning and requires service. The processor is preferably configured to provide an indication when a malfunction is detected, such as by illuminating an error light on the dispenser 10 itself or sending a communication to maintenance staff or facility management software.

In some manually activated embodiments of the invention, activations and an estimate of dosage can be detected by the load cells via activation force and time. This information can be stored and transmitted to a server, for example. Optionally, additional sensors for lever 64 position can be added to more accurately measure the lever 64 travel and thereby estimate the dosage delivered.

In some preferred embodiments, a group of different types of dispensers in the same area could be networked together to track multi-device hygiene events. For example, by detecting the sequence of uses of a glove dispenser and a hand sanitizer dispenser, it could be determined whether a proper hand hygiene protocol has been followed. This information could be used to track hand hygiene compliance, and for example provide warnings or reminders when non-compliance is detected. Usage of toilet paper dispensers followed by soap dispensers could be tracked in a similar manner, using data from the strain gauges 48.

All references herein to "the force measured by the load cell" are intended to include both measurements of the force at a single point in time, as well as measurements of the force over time, including changes in the force measured over time.

Although this disclosure has described and illustrated certain preferred embodiments of the invention, it is to be understood that the invention is not restricted to these particular embodiments. Rather, the invention includes all embodiments which are functional, electrical, or mechanical equivalents of the specific embodiments and features that have been described and illustrated herein.

We claim:

1. A system comprising:
a storage member for storing a product; and
a load cell that measures a force applied to the load cell;
wherein at least part of the force applied to the load cell is provided, directly or indirectly, by a weight of the product;
wherein the system is configured to determine a quantity of the product stored within the storage member based, at least in part, on the force measured by the load cell;
wherein the system is configured to identify at least one of the storage member and the product based, at least in part, on the force measured by the load cell;
wherein the system comprises a dispenser for dispensing the product; and
wherein the system is configured to adjust an operating parameter of the dispenser based, at least in part, on the identity of the at least one of the storage member and the product.

2. The system according to claim 1, wherein the system is configured to monitor the quantity of the product over time.

3. The system according to claim 2, wherein the system is configured to provide an indication when the quantity of the product reaches a threshold level.

4. The system according to claim 1, wherein the product comprises at least one of: hand cleaning fluid, toilet paper, paper towel, wipes, gloves, cleaning products, and hygiene products.

5. The system according to claim 1, wherein the system is configured to detect at least one of:
dispensing events, in which the product is dispensed from the dispenser, based, at least in part, on changes in the force measured by the load cell; and
failed dispensing events, in which the dispenser is activated without the product being dispensed from the dispenser, based, at least in part, on the force measured by the load cell.

6. The system according to claim 5, wherein the system is configured to determine a dosage setting of the dispenser based, at least in part, on changes in the force measured by the load cell.

7. The system according to claim 6, wherein the system is configured to determine the dosage setting of the dispenser during an initial time period; and
wherein the system is configured to determine the quantity of the product during a subsequent time period based, at least in part, on the dosage setting.

8. The system according to claim 1, wherein the operating parameter comprises a dosage setting of the dispenser.

9. The system according to claim 8, wherein the product comprises a fluid, and wherein identifying the at least one of the storage member and the product comprises at least one of: identifying a type of the fluid and identifying a size of the storage member.

10. The system according to claim 9, wherein the system is configured to adjust the dosage setting of the dispenser based, at least in part, on the type of the fluid.

11. The system according to claim 1, wherein the dispenser comprises the storage member; and
wherein the system is configured to identify the dispenser based, at least in part, on the force measured by the load cell.

12. The system according to claim 1, wherein the system is configured to determine when at least one of the storage member and the product is at least one of: removed, replaced, emptied, and refilled, based, at least in part, on the force measured by the load cell.

13. The system according to claim 1, wherein the system is configured to at least one of: generate, modify, and complete maintenance tasks based, at least in part, on the force measured by the load cell.

14. The system according to claim 1, wherein the product comprises a fluid, and wherein identifying the at least one of the storage member and the product comprises at least one of: identifying a type of the fluid and identifying a size of the storage member.

15. The system according to claim 14, wherein the system is configured to adjust the operating parameter of the dispenser based, at least in part, on the type of the fluid.

16. A system comprising:
a storage member for storing a product; and
a load cell that measures a force applied to the load cell;
wherein at least part of the force applied to the load cell is provided, directly or indirectly, by a weight of the product;
wherein the system is configured to determine a quantity of the product stored within the storage member based, at least in part, on the force measured by the load cell;
wherein the system comprises a dispenser for dispensing the product;
wherein the storage member comprises a rigid reservoir or a collapsible reservoir, and the product is a fluid;
wherein the collapsible reservoir collapses as the fluid is dispensed from the collapsible reservoir;
wherein the system comprises a housing;
wherein the collapsible reservoir engages with the housing as the collapsible reservoir collapses;
wherein the engagement of the collapsible reservoir with the housing is detectable as a change in a pattern of the force measured by the load cell; and
wherein the system is configured to determine whether the storage member comprises the rigid reservoir or the collapsible reservoir based, at least in part, on the pattern of the force measured by the load cell.

17. The system according to claim 16, wherein the system is configured to determine a dosage setting of the dispenser based, at least in part, on changes in the force measured by the load cell during an initial time period; and
if the system determines that the storage member comprises the collapsible reservoir, the system is configured to determine the quantity of the product during a subsequent time period based, at least in part, on the dosage setting and a detected number of dispensing events.

18. A system comprising:
a storage member for storing a product; and
a load cell that measures a force applied to the load cell;
wherein at least part of the force applied to the load cell is provided, directly or indirectly, by a weight of the product;

wherein the system is configured to determine a quantity of the product stored within the storage member based, at least in part, on the force measured by the load cell;

wherein the system is configured to identify at least one of the storage member and the product based, at least in part, on the force measured by the load cell;

wherein the system is configured to monitor the quantity of the product over time;

wherein the system is configured to provide an indication when the quantity of the product reaches a threshold level; and wherein the system is configured to adjust the threshold level based, at least in part, on the identity of the at least one of the storage member and the product.

19. The system according to claim 18, wherein the product comprises a fluid, and wherein identifying the at least one of the storage member and the product comprises at least one of: identifying a type of the fluid and identifying a size of the storage member.

20. The system according to claim 19, wherein the system is configured to adjust the threshold level based, at least in part, on the type of the fluid.

\* \* \* \* \*